(12) United States Patent
Rebouillat et al.

(10) Patent No.: US 9,240,259 B2
(45) Date of Patent: Jan. 19, 2016

(54) LIQUID COMPOSITIONS USED AS INSULATING AND HEAT TRANSFER MEANS, ELECTRICAL DEVICES CONTAINING SAID COMPOSITIONS AND PREPARATION METHOD FOR SUCH COMPOSITIONS

(71) Applicants: Serge Rebouillat, Echenevex (FR); Ferdinand G Thoonen, Guleph (CA); France Rochette, Toronto (CA); Benoit Steffenino, St. Julien en Genevois (FR)

(72) Inventors: Serge Rebouillat, Echenevex (FR); Ferdinand G Thoonen, Guleph (CA); France Rochette, Toronto (CA); Benoit Steffenino, St. Julien en Genevois (FR)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 13/647,009

(22) Filed: Oct. 8, 2012

(65) Prior Publication Data
US 2013/0099182 A1    Apr. 25, 2013

Related U.S. Application Data

(60) Provisional application No. 61/544,413, filed on Oct. 7, 2011.

(51) Int. Cl.
| | | |
|---|---|---|
| *H01B 3/22* | (2006.01) | |
| *H01B 3/20* | (2006.01) | |
| *H01F 27/12* | (2006.01) | |
| *C09K 5/10* | (2006.01) | |

(52) U.S. Cl.
CPC .. *H01B 3/20* (2013.01); *C09K 5/10* (2013.01); *H01B 3/22* (2013.01); *H01F 27/125* (2013.01)

(58) Field of Classification Search
None
See application file for complete search history.

(56) References Cited

U.S. PATENT DOCUMENTS

| | | |
|---|---|---|
| 6,323,392 B1 | 11/2001 | Charne |
| 6,822,461 B2 | 11/2004 | Klun |
| 2002/0027219 A1 | 3/2002 | Oommen et al. |

FOREIGN PATENT DOCUMENTS

| | | |
|---|---|---|
| EP | 1662513 | 5/2006 |
| WO | WO9722977 | 6/1997 |
| WO | WO9749100 | 12/1997 |
| WO | WO9831021 | 7/1998 |
| WO | WO0011682 | 3/2000 |
| WO | WO0051415 | 9/2000 |
| WO | WO03050345 | 6/2003 |
| WO | WO2004/008871 | * 12/2004 |
| WO | WO2004108871 | 12/2004 |
| WO | WO2007041785 | 4/2007 |
| WO | WO2009013349 | 1/2009 |
| WO | WO2010111698 | 9/2010 |
| WO | WO2010124118 | 10/2010 |

OTHER PUBLICATIONS

PCT International Search Report and Written opinion for International Application No. PCT/US2012/059259 Dated Oct. 14, 2013.

* cited by examiner

*Primary Examiner* — Necholus Ogden, Jr.

(57) ABSTRACT

The invention relates to a liquid composition that is a mixture of at least one natural triglyceride and at least one fatty acid ester different from triglycerides, wherein the fatty acids are derived from at least one vegetable oil or another equivalent natural resource.

6 Claims, 2 Drawing Sheets

LIQUID COMPOSITIONS USED AS INSULATING AND HEAT TRANSFER MEANS, ELECTRICAL DEVICES CONTAINING SAID COMPOSITIONS AND PREPARATION METHOD FOR SUCH COMPOSITIONS

BACKGROUND OF THE INVENTION

1. Field of the Invention

The present invention relates to compositions of dielectric fluids, useful particularly as insulating fluids and coolants in electrical devices such as, for example, transformers, capacitors, cables, or circuit breakers 2. Description of the Related Art Dielectric fluids compositions are commonly used in electrical devices, particularly in transformers. These liquids have the aim to isolate the various conductive elements of the device and to limit the heating of the device during its operation, and increase the useful life duration of the device. A performant fluid is essential to minimize the size of the device.

Much of the currently known dielectric liquid compositions are compositions comprising essentially hydrocarbons from specific cuts of crude oils. These compositions based on petroleum derivatives generally have a low ignition temperature (and therefore a significant flammability) and are also most often characterized by low biodegradability, if not also characterized by a relatively high toxicity (dielectric compositions based on petroleum derivatives have indeed, in most cases, aromatic molecules and/or halogen). These liquids are found to be relatively unsatisfactory for insulation of electrical devices. Indeed, especially when used in electrical transformers where large amounts of heat can be generated during operation, these fluids present significant flammable risks. In addition, in case of breakage of the envelope of the electrical device, liquid-based petroleum derivatives are likely to cause significant pollution (soil, rivers, ground water). In case of fire due to inflammation of these compounds, air pollution may also occur.

In addition to these dielectric fluids containing petroleum derivatives, one has developed other less toxic liquid compositions such as silicone oils, for example. These alternative compositions certainly prove more effective, but they have a much higher cost, and they are used in practice only in some specific appliances, with high-value, such as, for example traction transformers or electrical equipment installed in buildings of significant height and/or open to the public.

Therefore, to replace the dielectric fluids containing petroleum derivatives, one has sought to use compounds with interesting dielectric performances, which are nontoxic and biodegradable, and the synthesis of which is the cheapest possible. In this context, one has proposed including natural plant oils or animal waste fats as potential candidates, since some of them present some interesting insulation properties.

However, it has been found that natural plant oils cannot be used, in a large number of cases, as such as dielectric fluids in electrical devices such as, for example, transformers. Indeed, they have certain disadvantages, including high viscosity (especially at low temperatures) associated with a high pour point, and in general, they also may exhibit an important tendency to oxidation (oxidability) pending on their source, refining or handling in general.

To improve the characteristics of vegetable oils it has been proposed (in international applications WO 97/22977, WO 97/49100, WO 98/31021 and WO 00/11682) to modify these oils, by adding antioxidants, antifreeze, or viscosity improvers such as polymethacrylates, to counteract the aforementioned defects. However, these additives are also generally low or non-biodegradable or toxic, they prove to be damaging to electrical devices in which they are used. This is particularly the case of polymethacrylates, known for its acidity, which can therefore lead to significant corrosion in electrical devices, and particularly in electrical transformers.

To a lesser extent, attempts have been made to change the triglycerides (esters of glycerol and fatty acids) present in natural vegetable oils, in order to modify the properties of such vegetable oils without losing their biodegradability. In this regard, various attempts have been made to convert these esters of glycerol in esters of other alcohols, such as esters of isobutanol. These tests are however not fully conclusive: indeed, the works done in this particular context have failed to obtain compositions having all the physical and chemical properties that such a composition should have for an efficient and sustainable use in an electrical device. In particular, the tests performed so far to change the triglycerides of natural vegetable oils have failed to produce compositions with all the required characteristics for use as cooling dielectric fluid in a dielectric device. In particular, one has never described compositions of modified vegetable oils from a transformation of present triglycerides, which have properties adapted both in terms of electrical insulation, cooling properties, low viscosity, low density and stability vis-à-vis oxidation, as required by international standards IEC 60296, IEC 60465, or IEC 61099 and equivalent.

WO 2004/108871 discloses liquid compositions that are based on modified oleic canola oil and are used as insulating liquids and heat transfer liquids, and electrical devices containing said liquid compositions. In this prior publication, the liquid composition is based on a mixture of natural triglycerides and fatty acid esters of 2-ethyl-1-hexanol, said fatty acids usually derived from a vegetable oil, the mixture may optionally contain other esters, in which:

(i) the fatty acids present in all the esters of glycerol (triglycerides) and esters of 2-ethyl-1-hexanol mixture include, by weight with respect to the total mass of fatty acids in the esters:
  at least 70%, and preferably between 72 and 90% monounsaturated fatty acids in $C_{18}$, such as, for example, oleic acid
  between 10 and 20% of polyunsaturated fatty acids, the polyunsaturated fatty acids are generally mostly polyunsaturated fatty acids in $C_{18}$, such as linoleic acid and/or linolenic acid
  less than 10% and preferably less than 7% of fatty acids having a hydrocarbon chain containing a number of different carbon atoms of 18, and
(ii) the triglycerides present in the mixture corresponds to a mass of 25 to 80%, preferably between 40 and 75% compared to the total mass of the mixture, the fatty acid esters other than triglycerides present in said composition being, in general, essentially mono-esters of 2-ethyl-1-hexanol.

The main idea in this prior publication, which is further discussed below, was that by modifying some specific natural vegetable oils by converting the triglycerides of fatty acids present in a fraction of these oils in particular esters of an alcohol, namely 2-ethyl-1-hexanol, one obtained electrically insulating liquid compositions which, subject to control the final content of esters of 2-ethyl-1-hexanol, proved well suited as a dielectric fluid coolant for electrical devices, especially according to the criteria of these standards. Unexpectedly, these modified oils obtained after modification of a fraction of the oil with 2-ethyl-1-hexanol have interesting properties, especially in terms of electrical insulation and viscosity. Thus, the compositions obtained had proven to possess high breakdown voltages and low viscosities.

WO 2010/111698 discloses the use of soy oil as a heat-transfer dielectric fluid in a device to generate, store, convert and/or distribute electrical energy wherein the soy oil is one in which at least 70% of the fatty acids are C14 to C22 mono-unsaturated and less than 16% of the fatty acids are polyunsaturated.

A first example of a method for the extraction and the processing of soybean seeds to produce soybean oil and meal has been described in WO 2010/111698.

Another example of a method for producing fatty acid esters from flattened oleaginous grains has been disclosed in WO 2009/013349.

More specifically, the process taught by this prior publication is used to prepare fatty acid esters which can be used as biodiesel, prepared from whole oilseeds, and comprises the following steps:
a. Preheating the whole non-hulled seeds;
b. Flattening the oilseeds with their husks;
c. Drying the flattened seeds so as to obtain a water and volatile matter content of between 0.5 and 2.5%, preferably between 1.5% and 2%;
d. Transesterification by contacting the flattened, dried seeds with an alcohol medium in the presence of a catalyst;
e. Separating the liquid and solid phases resulting from transesterification;
f. Neutralizing the liquid phase derived from step e); and
g. Removing the alcohol and separating the glycerin from the fatty acid esters.

Document WO 2010/124118, on the other hand discloses a process and device for making grease. In this publication, it has in particular been shown that vegetable oils have a uniquely different behavior when exposed to high temperatures. In the case of some vegetable oils, once the oil temperature exceeds 150° C. (300° F.), the oil begins to oxidize rapidly and if steps are not taken to remedy this rapid oxidation, the product will begin to polymerize, resulting in irreversible change. In such cases, the product could partially or fully polymerize or change state from a soap into a polymer with no or little lubrication value. But, several methods exist for stabilizing soybean or other vegetable oils so they can be reacted with lithium and produce stable greases. The use of high oleic vegetable oils is often employed to improve the oxidation stability of the final product. Vegetable oils, due to their higher viscosity index, present a more stable body when exposed to high temperatures. As a result, properly formulated vegetable oil-based grease would show more stable body in use.

In this prior publication, the Applicant has discovered, inter alia, that a soap, and in turn, grease of the described invention can provide an optimal combination of properties as compared to comparable soaps and greases prepared using conventional heating methods (e.g., hot plate, thermal blankets). The ability to provide more uniform and controllable heating can, in turn, help to make the entire process both faster and more efficient as well. More specifically, it has been described that heating with microwave energy imparts significantly less oxidative damage to a composition as compared to the same composition when heated using conventional means. For instance, the term OSI (for "Oil Stability Index") is a value that often corresponds with the ability of an oil composition to resist oxidation. A suitable method for determining OSI is known as the AOCS test method Cd 12-92, the disclosure of which is incorporated in this prior publication by reference. In turn, it is typically the fact that the higher the OSI, generally the better suited the composition will be for use, both in terms of initially preparing a soap, and also in terms of using the soap or corresponding grease over a longer period of time. To summarize, it has been shown in this prior publication that the use of microwaves to heat oils, typically oils with high oleic acid content, allows them to maintain their OSI high, in other words their ability to resist oxidation relative to their use as greases especially. The suitability of the OSI testing and relevance to the real performance in use of transformers remain unestablished.

For the electrical purpose of the present invention, fluids based on the use of vegetable oils traditionally use refined, bleached, deodorized and winterized (RBD) oils; therefore all prior usage is established on that basis. In traditional RBD operations. impurities are removed at various steps namely degumming, neutralizing, washing, drying, bleaching, filtering and deodorizing. This chemical process has many drawbacks, such as high energy demand, disposal of polluted effluents but also loss of essential components of the oils which have protective attributes in terms of the durability and preservation of the oil in food or industrial applications. In addition, RBD refineries are very large plants, which may not be suited to industrial applications of the invention.

SUMMARY OF THE INVENTION

A liquid composition that may be used as a dielectric composition, said composition comprising a mixture of at least one natural triglyceride and at least one fatty acid ester different from triglycerides, said fatty acids of the fatty acid ester zo being derived from at least one vegetable oil or another equivalent natural resource, wherein:
(i) the fatty acids present in the at least one natural triglyceride and in the at least one fatty acid ester different from triglycerides comprise, by weight with respect to the total weight of fatty acids in the esters:
  at least 70%, and preferably over 85%, of at least one monounsaturated fatty acid,
  0 to less than 10% of at least one polyunsaturated fatty acid,
  less than 20% and preferably less than 10% of at least one fatty acid having a hydrocarbon chain containing a number of carbon atoms different from 18, and wherein
(ii) the at least one natural triglyceride present in the mixture corresponds to 10 to 90% by weight, preferably to 40 and 75% by weight compared to the total weight of the mixture.

A method to prepare fatty acid esters for use as a dielectric composition, prepared from whole oilseeds or other equivalent components, wherein said process comprises the following steps:
a. Preheating the whole non-hulled seeds;
b. Flattening the oilseeds with their husks in order to form a homogenic layer;
c. Drying the flattened seeds so as to obtain a water and volatile matter content of between 0.05 and 2.5%, preferably between 0.5% and 1.5%;
d. Transesterification and/or co-transesterification by contacting the flattened, dried seeds with an alcohol medium in the presence of a catalyst;
e. Separating the liquid and solid phases resulting from transesterifications;
f. Neutralizing the liquid phase derived from step e); and
g. Removing the alcohol and separating the glycerin from the fatty acid esters, wherein at least steps (a) and (c) are carried out with microwaves.

BRIEF DESCRIPTION OF THE DRAWINGS

The compositions methods of the present invention will be better understood from the following detailed description and by reference to the drawings, in which.

DETAILED DESCRIPTION OF THE INVENTION

Figure 1:
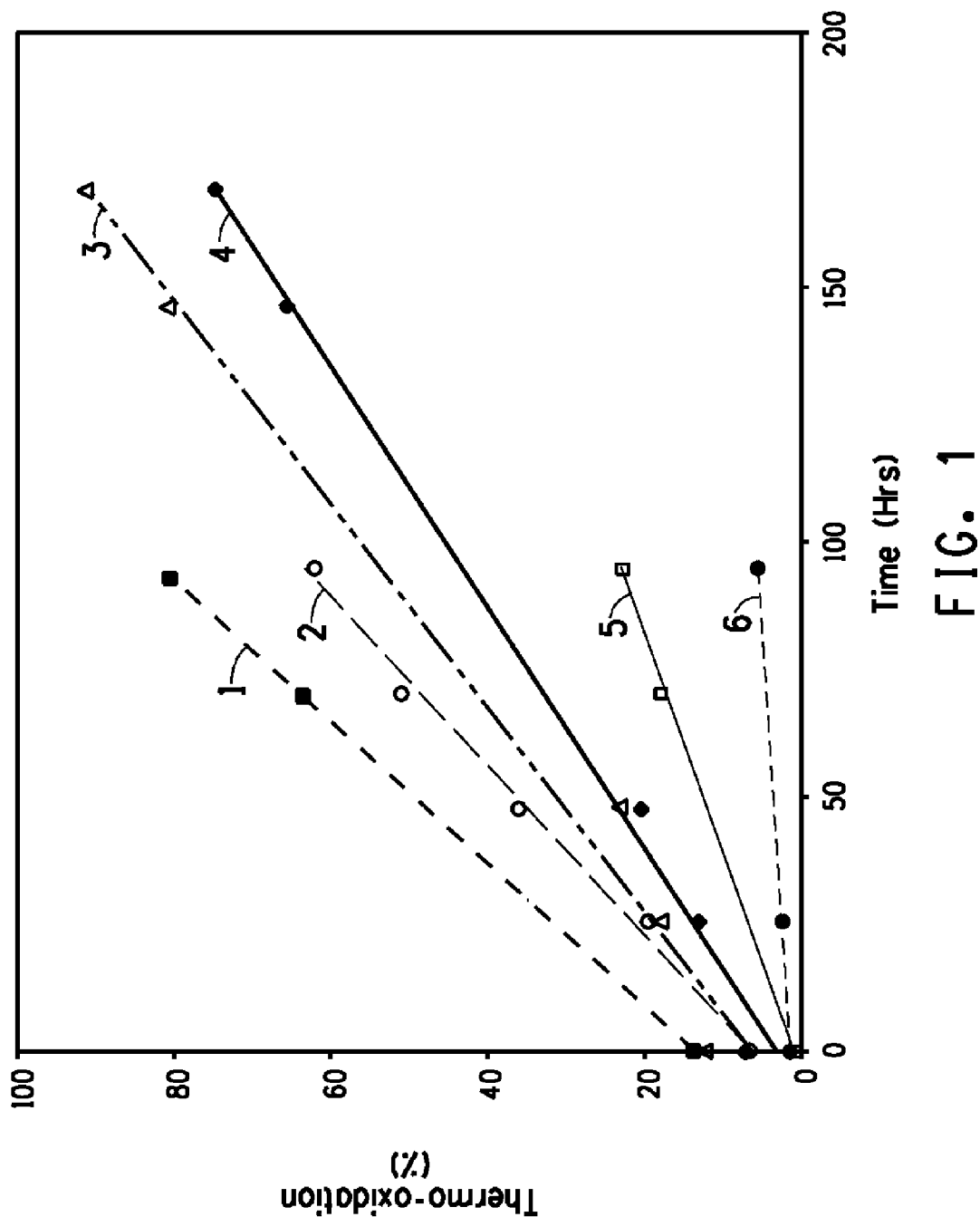
FIG. 1 illustrates several curves comparing the evolution of thermo-oxidation level (% and rate) with time.

This invention allows providing, generally at a very interesting cost, compositions preferably having the advantageous characteristics (if not even better characteristics listed in table 1 below (equivalent Test Methods are included):

TABLE 1

| Property | Limit | Test Method |
|---|---|---|
| Volumic mass at 20° C. | ≤0.95 g · ml$^{-1}$ | ISO 3675 |
| Kinematic viscosity at 40° C. | ≤28 mm$^2$ · s$^{-1}$ | ISO 3104 |
| Flow point | ≤−25 C. | ISO 3016 |
| Voltage breakdown | >55 kV | CEI 60156 |
| FDD (Tan δ) at 90° C. | <0.02 | CEI 60247 |
| Thermal conductivity at 20° C. | >0.15 W · m$^{-1}$ K$^{-1}$ | Hot wire |
| Flash point (in isolation) | >250° C. | ISO 2719 |
| Acid Index | <0.1 mgKOH · g$^{-1}$ | ISO 660 |
| Primary Biodegradability at 21 days | >90% | CEC L-33-A-94 |

In an embodiment, the invention concerns a liquid composition that may be used as a dielectric composition, based on a mixture of natural triglycerides and fatty acid esters, said fatty acids being usually derived from a vegetable oil or another equivalent component, in which:
(i) the fatty acids present in all the esters include, by weight with respect to the total mass of fatty acids in the esters:
 at least 70%, and preferably over 85%, of monounsaturated fatty acids,
 0 to less then 10% of polyunsaturated fatty acids, preferably 0.01 to less than 10%, more preferred 0.05 to less than 10%
 less than 20% and preferably less than 10% of fatty acids having a hydrocarbon chain containing a number of carbon atoms different from 18, and
(ii) the triglycerides present in the mixture corresponds to a mass of 10 to 90%, preferably between 40 and 75% compared to the total mass of the mixture. The fatty acid esters other than triglycerides present in said composition being, in general, essentially mono-esters. Preferably they are mono-fatty acid esters of 2-ethyl-1-hexanol.

Preferably the above liquid composition is based on a mixture of at least one natural triglyceride and at least one fatty acid ester, wherein said at least one fatty acid ester is different from a triglyceride and is derived from at least one natural triglyceride by converting the natural triglyceride with an alcohol into the at least one fatty acid ester, wherein said alcohol is different from glycerol. The term "fatty acid ester is different from a triglyceride" means that the fatty acid ester is not a triglyceride, i.e. is not a fatty acid tri-ester of glycerol.

In an embodiment, the mixture of esters of fatty acids contained in said composition is a mixture of:
 10 to 90% by volume of a vegetable oil or another equivalent component having the following fatty acid composition, by weight relative to the total mass of fatty acid esters of the oil or other equivalent component:
 at least 70% monounsaturated fatty acids in $C_{12}$ to $C_{24}$;
 diunsaturated acid (C12:2 to C24:2: less than 10%,
 triunsaturated acid (C12:3 to C24:3): at most 5%,
provided that the total content of di-unsaturated acid and tri-unsaturated acid is less than 10%, preferably less than or equal to 7%, preferably less than or equal to 5% preferably less than or equal to 3%,
 less than 5% of fatty acids having more than 18 carbon atoms
and
 from 90 to 10% by volume of said vegetable oil or equivalent component, in which the triglycerides have been converted into esters such that the resulting composition has a pour point lower than −10° C. and fire point higher than 180° C., preferably higher than 240° C.

The triglycerides have been converted, for example, into esters of 2-ethyl-1-hexanol. Branched, linear and cyclic alcohols, preferably from bio-based sources are suitable pending on the resulting properties of the compositions such as dielectric, climate, biodegradability, rheology performances.

Other suitable alcohols are polyols such as:
Ethane 1,2 diol
Propane 1,2 diol
Propane 1,3 diol
Methyl-2 propane 1,3 diol
Dimethyl 2,2 propane 1,3 diol
Ethyl 2 propane 1,3 diol
Diethyl 2,2 propane 1,3 diol
2 butyl 2 ethyl propane 1,3 diol
Butane 1,4 diol
Pentane 1,5 diol
Methyl 4 butane 1,4 diol
Pentane 2,3 diol
Hexane 1,6 diol
Octane 1,8 diol
Decane 1,10 diol
Dodecane 1,12 diol
Octadecane 1,12 diol
Trimethylol propane (TMOP)
Pentaerythrol
Dipentaerythrol
Neopentylglycol (NPG)
Phtalyl alcohol
Isophtalyl alcohol
Terepthalyl alcohol
Diglycerol (linear and cyclic)
Triglycerol
dihydroxyacetone
1,4 cyclohexane dimethanol
bisphenol-A
Isosorbide
2,5 bis(hydroxymethyl)tetrahydrofurane
2,5 bis(hydroxymethyl)furane
1,8 terpine
1,8 terpineol
(place and/or repeat above list where it best fits)

In an embodiment, the volume ratio of non-modified oil/modified oil is between 90:10, 75:25 and 40:60, especially between 35:65 and 50:50.

In an embodiment, the vegetable oil is a UHO (ultra high oleic) canola oil, or HO (high oleic) sunflower oil, or HO soybean oil having a C12:1 to C24:1 acid content greater than or equal to 70%. Fractionated palm oil and blend therewith, meeting this compositional criteria are also suitable.

In an embodiment, the invention relates to the use of a composition as an electrically insulating and heat transfer liquid in a device to generate, store, convert and/or distribute electrical energy.

In an embodiment, the device to generate, store, convert and/or distribute electrical energy comprises as electrically insulating liquid coolant a composition according to the present invention.

In an embodiment, the device to generate, store, convert and/or distribute electrical energy comprises as electrically insulating paper or films, a paper or films impregnated with the composition according to the present invention.

In an embodiment, the invention concerns a method to prepare fatty acid esters for use as a dielectric composition, prepared from whole oilseeds or other equivalent components, wherein said process comprises the following steps:
a. Preheating the whole non-hulled seeds;
b. Flattening the oilseeds with their husks in order to form a homogenic layer;
c. Drying the flattened seeds so as to obtain a water and volatile matter content of between 0.05 and 2.5%, preferably between 0.5% and 1.5%;
d. Transesterification and/or co-transesterification by contacting the flattened, dried seeds with an alcohol medium in the presence of a catalyst;
e. Separating the liquid and solid phases resulting from transesterifications;
f. Neutralizing the liquid phase derived from step e);
and
g. Removing the alcohol and separating the glycerin from the fatty acid esters, wherein at least steps (a) and (c) are carried out with microwaves.

In an embodiment, the other steps (b) and (d) to (g) are carried out under the assistance of microwaves.

In an embodiment, the catalyst at the transesterification and/or co-transesterification step d) is enzymatic and/or basic and/or acid, and/or solid, and/or liquid.

For the purposes of this description, the expression "composition based on a mixture of fatty acid esters" means a composition consisting wholly or partly of a mixture of fatty acid esters, namely a mixture of esters of saturated carboxylic acids or unsaturated comprising essentially from 6 to 24 carbon atoms. Esters of fatty acid composition of the invention are generally based on esters of fatty acids of vegetable origin, plants in general, or wood treatment derivates, such as tall oil, or algae or microalgae or animal fat or derived from sugars, these fatty acids are usually derived from one or more vegetable oils, plants in general, or wood treatment derivates, such as tall oil, or algae or microalgae or animal fat origin or derived from sugars.

Preferably, a composition based on fatty acid esters of the invention is primarily (and often exclusively) composed of a mixture of fatty acid esters. Thus, according to a preferred embodiment, a composition of the invention comprises at least 98% and preferably at least 99% by weight of a mixture of fatty acid esters, optionally in combination with compounds in trace amounts, i.e. generally present at less than 2% by weight, preferably at less than 1% by weight, even at less than 0, 5% by weight, such as free fatty acids, free alcohols, and/or mono- or diglycerides and less than 500 ppm of water preferably less than 250 ppm of free water after conditioning.

However, in a possible embodiment, a dielectric composition of the invention may comprise, as additional elements other than the fatty acid esters, including common antioxidants or agents commonly used to lower the pour point of an oil and/or to ensure antifreeze properties, these additives are preferably biodegradable and nontoxic. If necessary, the composition of the invention, however, is mostly composed of fatty acid esters for at least 80% by weight, advantageously at least 90% by weight, and even more preferably at least 95% by weight.

The mix of esters of fatty acids present in a composition of the invention is characterized by a specific fatty acid composition, as defined in above, associated with a particular composition of alcohol, such as defined above. The expression "fatty acid composition" (or "fatty acid profile") is used throughout this description such as it is commonly used in the characterization of vegetable oils, namely that an amount "in a fatty acid" given in a mixture of fatty acid esters is calculated after conversion of all fatty acid esters present in methanol esters by the mass ratio of the amount of said ester fatty acid methanol relative to the total amount of methanol esters of fatty acids of the mixture. Thus, the expression "fatty acid profile" as defined herein has the meaning, but not limited to, given to it in accordance with ISO 5508.

Similarly, one can define a "triglycerides content" of a mixture of fatty acid esters, said "triglycerides content" in a mixture of fatty acid esters being defined by the mass ratio of the amount of mixture of triglycerides, relative to the total mass of the mixture of fatty acid esters. Experimentally, the triglyceride profile of a composition containing a mixture of fatty acid esters can be determined by liquid chromatography (e.g. HPLC) and by quantifying the proportions of the different triglycerides and fatty acid esters separated which were obtained after chromatography.

Typically, in a composition of the invention the content of monounsaturated fatty acids in $C_{12}$ to $C_{24}$ is greater than or equal to 70% by weight, this content is usually between 72 and 90% by weight.

Preferably, this monounsaturated fatty acid is in $C_{12}$ to $C_{24}$ content is at least 73% by weight, and preferably at least 76% by weight.

By "monounsaturated fatty acid in $C_{12}$ to $C_{24}$" one defines in the sense of the present description a carboxylic acid with 12 carbon atoms (or more) and presenting only one unsaturation (C=C bond) in its hydrocarbon chain, this carboxylic acid being preferably linear.

Preferably, the monounsaturated fatty acid esters in $C_{12}$ to $C_{24}$ present in a composition according to the invention are, entirely or partially (and preferably essentially i.e. at least 95% in mass and preferably in at least 98% in mass) esters of oleic acid, $CH_3-(CH_2)_7-CH=CH-(CH_2)_7-COOH$, where the double bond is in position 9 and of cis configuration.

In addition, an isolating composition according to the invention has, characteristically, an amount of polyunsaturated fatty acids which is less than 10%, equal to or less than 7%, equal to or less than 5%, equal to or less than 3% in mass. By "polyunsaturated fatty acid" one means, in the sense of the present description, a carboxylic acid having more than one unsaturation in its hydrocarbon chain, this acid having generally 12 to 24 carbon atoms. In general, the polyunsaturated fatty acids present in the composition of the invention are essentially fatty acids in $C_{18}$ and are preferably linoleic acid and/or linolenic acid, optionally in combination with trace amounts of other polyunsaturated fatty acids. Of course other polyunsaturated acids may be envisaged as a skilled person may understand from the present description. Preferably, the content of polyunsaturated fatty acids in a composition of the invention is less than 10% by weight, and preferably less than 7%, preferably less than 5% and preferably less than 3% by weight. In this regard, without wishing to be bound in any way by theory, previous works may suggest that the oxidation resistance of a composition according to the invention increases as the content of polyunsaturated fatty acids decreases. Accordingly, it is of importance to reduce the proportion of such polyunsaturated acids as much as possible.

The content of a composition of the invention in fatty acids other than monounsaturated and polyunsaturated fatty acids, in $C_{12}$ to $C_{24}$ is generally less than 20% by weight, preferably less than 10% by weight. In any case, the content of fatty acids having a hydrocarbon chain containing a number of carbon atoms different from 18 is typically less than 5% and typically less than or equal to 3% by weight. According to an advantageous embodiment, a composition of the invention, the fatty acids other than fatty acids with monounsaturated and polyunsaturated $C_{18}$ consist essentially of a mixture comprising one or more compounds selected from stearic acid, palmitic acid, arachidic acid, acid eicosenoic, behenic acid and erucic acid.

In general, in a composition of the invention, esters of fatty acids other than fatty acid monoesters such as fatty acid esters of 2-ethyl-1-hexanol are essentially, and preferably all, of triglycerides, i.e. triesters of fatty acids from glycerol.

However, according to one possible embodiment, the fatty acid esters other than triglycerides and fatty acid esters of 2-ethyl-1-hexanol may include other esters of monoalcohols, such as esters of C3 or C5 alcohols, or esters of complex alcohols, such as, for example esters of neopentyl glycol, trimethylolpropane, pentaerythritol or of dipentaerythrol. If necessary, it is preferred that the content (triglycerides+fatty acid esters such as fatty acid ester of 2-ethyl-1-hexanol) in the composition of the invention is at least 80%.

Branched, linear and cyclic alcohols, preferably from biobased sources are suitable pending on the resulting properties of the compositions such as dielectric, climate, biodegradability and rheology performances.

Other suitable alcohols are polyols such as:
Ethane 1,2 diol
Propane 1,2 diol
Propane 1,3 diol
Methyl-2 propane 1,3 diol
Dimethyl 2,2 propane 1,3 diol
Ethyl 2 propane 1,3 diol
Diethyl 2,2 propane 1,3 diol
2 butyl 2 ethyl propane 1,3 diol
Butane 1,4 diol
Pentane 1,5 diol
Methyl 4 butane 1, 4 diol
Pentane 2,3 diol
Hexane 1,6 diol
Octane 1,8 diol
Decane 1,10 diol
Dodecane 1,12 diol
Octadecane 1,12 diol
Trimethylol propane (TMOP)
Pentaerythrol
Dipentaerythrol
Neopentylglycol (NPG)
Phtalyl alcohol
Isophtalyl alcohol
Terepthalyl alcohol
Diglycerol (linear and cyclic)
Triglycerol
dihydroxyacetone
1,4 cyclohexane dimethanol
bisphenol-A
Isosorbide
2,5 bis(hydroxymethyl)tetrahydrofurane
2,5 bis(hydroxymethyl)furane
1,8 terpine
1,8 terpineol Preferably the esters other than triglycerides have a pour point lower than −10° C. and a fire point higher than 250° C.

Examples of such esters, with an indication of they pour point value, are: 2-ethyl hexyl oleate −36° C., neopentyl glycol dioleate −27° C., trimethylol propane trioleate −24° C., pentaerythritol tetraoleate −15° C., isobutyl oleate −27° C. and isopropyl oleate −9° C. with almost meets the requirement above.

Depression of the pour point is not systematically proportional to the amount of esters and is therefore best predicted by simulation on a case by case basis.

Preferably, the monounsaturated acids C12:1 to C24:1 are in a proportion equal to or higher than 85% and polyunsaturated acids like $C_{12}$ to $C_{24}$ equal to or less than 10%, equal to or less than 7%, or equal to or less than 5%, equal to or less than 3%.

In general, a composition of the invention can be obtained by mixing a first component such as vegetable oils, or equivalent natural resources such as plants in general, or wood treatment derivates, such as tall oil, or algae or microalgae or animal fat or derived from sugars and a mixture of esters such as of 2-ethylhexanol obtained by conversion of triglyceride of a second component, identical or different from said first component, provided that the mixture leads to fatty acid profile defined above. One can thus use mixtures of several different components for the formation of the composition of the invention, although in most cases, a single oil is used or other components as mentioned in the present description.

According to a particularly advantageous embodiment, the mixture of esters of fatty acids contained in a composition of the invention is obtained from a vegetable oil X having a fatty acid composition as defined for the composition of the invention, namely a monounsaturated fatty acid content in $C_{12}$ to $C_{24}$ of at least 70% by weight relative to the total mass of fatty acid esters of the oil X, a polyunsaturated fatty acid content of less than 10% by weight and a fatty acid having a number of carbon atoms different from 18 less than 10% by weight, preferably having the above preferred amounts. The mixture of fatty acid esters of the invention is then obtained by treating a fraction of said vegetable oil X, namely between 10% and 90% of volume of oil X, with, for example, 2-ethyl-1-hexanol, thereby converting the triglycerides (triesters of fatty acids and glycerol) initially contained in that fraction of the vegetable oil in esters of an alcohol, for example, 2-ethyl-1-hexanol.

The conversion of triglycerides to esters of, for example, 2-ethyl-1-hexanol is an operation, which may also be achieved by hydrolysis of triglycerides followed by esterification with, for example, 2-ethyl-1-hexanol. In another conceivable alternative, this conversion can also be achieved by transesterification (direct reaction of triglycerides with 2-ethyl-1-hexanol or other alcohol) or by transesterification of an already formed monoester. The reaction can be performed under various chemical conditions, such as acid or base catalyzed, liquid or solid, or more preferably via enzymatic catalysis, more preferably via non-immobilised enzymatic catalysis for the sake of preserving other attributes of the raw materials, and lower cost.

Whatever the nature of the conversion implementation, it is generally preferable that this conversion is carried out in minimizing the formation of by-products, particularly by limiting the formation of free fatty acids. Indeed, in too high quantity, these acids would likely induce "corrosion" in electrical devices where they are employed. The process for preparing the compositions of the invention allows to control the acid content including its minimizing, if necessary, allowing in particular to obtain compositions highly compatible with use in an electrical device such that a transformer.

Preferably, the mixture of esters of fatty acids present in a composition of the invention is preferably a mixture from 10 to 90% by volume of a vegetable oil X and 90 to 10% by volume of the same vegetable oil X, in which the triglycerides have been converted, preferably in full, in esters such as esters of 2-ethyl-1-hexanol. Preferably, in this mixture, the volume ratio of non-modified vegetable oil X/modified vegetable oil X is between 90:10, 75:25 and 40:60 and preferably between 65:35 and 50:50. "Modified oil X" means oil X in which the triglycerides were converted into esters such as esters of 2-ethyl-1-hexanol.

According to a particularly advantageous embodiment of the invention, vegetable oil X is a canola oil known as "ultra high oleic canola" UHOC, namely a canola oil with an oleic acid content greater than or equal to 70%, preferably greater than or equal to 80%, most preferably greater than or equal to 85%.

Particularly advantageously, as a non-limiting example, the oleic canola oil used for the preparation of a composition of the invention has the following composition of fatty acids (percentage by mass):
  monounsaturated acid (C12:1 to to C24:1: about 70 to 90%,
  diunsaturated acid (C12:2 to C24:2: below 10%,
  triunsaturated acid (C12:3 to C24:3): at most 5%,
provided that the total content of di-unsaturated acid and tri-unsaturated acid is less than 10%, preferably less than or equal to 7%, preferably less than or equal to 5% preferably less than or equal to 3%,
  Palmitic acid (C16:0): about 3.0 to 7.0%,
  Stearic acid (C18:0): about 1.0 to 5%
  Arachidic acid (C20:0): about 0.1 to 0.8%,
  Eicosenoic acid (C20:1): about 0.5 to 2, 0%
  Behenic acid: less than 1,5%
  Erucic acid: less than 0,3%
  Other acids: less than 2, 5%.

As was previously pointed out, given their different characteristics, the dielectric compositions of the invention can be advantageously used as electrically insulating and cooling liquid compositions in electrical devices such as transformers, capacitors, circuit breakers, cables, or motors. Those compositions are more generally of interest to generate, store, convert and/or distribute electrical energy.

Broadly defined, a dielectric fluid composition for use in electrical devices must have a breakdown voltage above 30 kV, preferably higher than 45 kV, and even more preferably at least 55 kV. It is even more advantageous than the breakdown voltage is at least 70 kV. By the term "voltage breakdown" of a composition, one intends the maximal value alternative voltage of industrial frequency (of 50 or 60 Hz) that one may apply between two electrodes distant of 2.5 mm and dipped into said composition, without any discharge being observed between the two electrodes. More strictly, the breakdown voltage designates this voltage value as measured according to the test protocol defined by the norm CEI 60156 or equivalent. Because of its specific formulation, the dielectric composition of the invention generally has a breakdown voltage of over 70 kV, this voltage being generally over or equal to 80 kV or even over or equal to 90 kV. These particularly marked electrical insulation properties make the compositions of the invention particularly suitable for devices such as transformers.

Moreover, besides the high breakdown voltage, the particular formulation developed by the inventors has many desirable properties for applications in the field of electrical insulation.

In addition, the dielectric compositions of the invention have particular viscosity characteristics suitable for implementation for insulation and cooling of electrical devices, such as transformers. In particular, they exhibit characteristics of dynamic viscosity required for this type of application, as defined and measured according to ISO 3104 (or CEI 61868 for very low temperatures). Thus, a composition of the invention generally has a dynamic viscosity (measured at 40° C. by capillary flow of the composition of liquid under its own weight) below 30 mm$^2$.s$_{-1}$, and typically between 12 and 28 mm$^2$.s$_{-1}$, that is to say, a lower viscosity than silicone oils. Previous works appear to suggest that the viscosity of a composition of the invention decreases with the amount of esters such as esters of 2-ethylhexanol. So if one wants to reduce the viscosity for particular applications, it is advantageous to use compositions in which the ester content of 2-ethylhexanol ester is the highest possible, provided of course that the ester content of 2-ethylhexanol ester is consistent with other characteristics desired for the composition.

Thus, a composition of the invention generally has other interesting dielectric properties, including a value of dielectric dissipation factor (FDD or tan δ) generally between 0.15 and 0.0005, this value is preferably less than 0.02 and more preferably less than 0.005. By "dielectric dissipation factor (FDD or tan δ)" one intends in the meaning of the present invention the tangent of the loss angle as it may be measured at 90° C. according to the method described in nom CEI 60247 or equivalent, by measuring the phase displacement between the voltage applied and the resulting current in a capacitor in which the dielectric medium is exclusively made of the present composition.

Moreover, the dielectric compositions of the invention generally have a density lower than that of liquid water, and in general than that of ice. Thus, the density is less than 0.95 kg.dm$^{-3}$, and preferably less than 0.90 kg.dm$^{-3}$ measured at 20° C. according to ISO 3675. This feature proves particularly advantageous for use in devices like transformers where traces of water are likely to penetrate. If necessary, water, heavier than the liquid composition filling the transformer will migrate to the bottom of the transformer, thereby limiting the risk of degradation and reduction of insulating character of the composition.

In addition, a composition of the invention exhibits a particularly advantageous pour point, typically below −21° C., the pour point being generally less than or equal to −25° C., and preferably less than or equal to −30° C. The pour point is defined as the temperature at which an oil congeals. This particular temperature can be determined according to ISO 3016. In general, the pour point of a composition according to the invention tends to increase when the content of polyunsaturated fatty acids present in the esters increases. In addition, the pour point of a composition of the invention is, in general, especially lower when the esters present in the composition have a high content of mono-esters. Thus, to obtain a composition of the invention having a pour point as low as possible, it is generally advantageous to favor the presence of mono-esters of polyunsaturated fatty acids at the expense of other esters. The selection of the alcohols to form the esters is critical, such as branched esters may exhibit lower pour point than linear ones given their crystallization profile.

Finally, a composition of the invention has a high flash point, which tends to increase when the content of esters such as esters of 2-ethylhexanol decreases. The flash point of a composition is the temperature at which the composition becomes flammable when approaching a fire, including measured according to ISO 2592 (Method Cleveland in the open air), or advantageously, according to ISO 2719 (method Penske-Martens in isolation). The flash point of a composition of the invention is generally at least 200° C., preferably at least 250° C. and can exceed 280° C. or 300° C., especially when the content of the ester of 2-ethylhexanol is sufficiently low. These particularly high flash points are equivalent to those of best dielectric liquids at high fire resistance currently known.

In addition, a composition of the invention has usually a good thermal conductivity, generally above $0.15\ W \cdot m^{-1} \cdot K^{-1}$, and usually at least $0.20\ W \cdot m^{-1} \cdot K^{-1}$ at 20° C., i.e. higher than that of currently known dielectric fluids. The thermal conductivity is measured by the amount of heat flowing per unit time in steady state, as a result of a thermal gradient between two isothermal spots of the liquid (so-called "hot wire").

On the other hand, a composition according to the invention usually has a very low acidity, and thus preferably has an acid number less than 0.1 mg KOH/g, and preferably less than 0.08 mg KOH/g (values measured according to ISO 660). This low acidity makes it particularly suitable for use in an electrical device, especially in an electrical transformer.

In addition to these interesting properties for applications in electrical devices, the compositions of the invention possess interesting biodegradability features. Thus, the biodegradability of a composition of the invention, as measured by the CEC L-33-A-94, is such that they are biodegraded to over 95% after 21 days. The compositions of the present invention, based on natural vegetable oils or other components as indicated as examples above, also exhibit an extremely low toxicity.

Given these different characteristics, a composition of the invention is particularly suitable as a dielectric fluid for electrical devices. Electrical devices including insulating composition, a composition of the invention, in particular electrical transformers containing such a composition, is another specific object of the invention.

The compositions of the invention, including compositions of triglycerides and esters such as 2-ethyl-hexyl oleate, 2-EHO, derived from UHOC, prove particularly suitable for use in transformers.

In this regard, it should be noted that depending on the nature and dimensions of a transformer, the characteristics that are required for the dielectric liquid used there can vary quite widely. In general, the compositions of the invention are well adapted to most conventional transformers; some of them are even more suited to certain types of special transformers.

For example, the invention provides, according to a specific aspect, compositions which are particularly suitable as a dielectric fluid and coolant in a transformer completely filled sealed and rated at 100 kVA, containing 130 kg of that liquid, these particular compositions having the characteristics listed in Table 2 below or even better characteristics:

TABLE 2

| Property | Limit | Trial Method |
|---|---|---|
| Volumic mass at 20° C. | $\leq 0.90\ g \cdot ml^{-1}$ | ISO 3675 |
| Water content (at delivery) | $<80\ mg \cdot kg^{-1}$ | CEI 60814 |
| Breakdown voltage | >70 kV | CEI 60156 |
| FDD (tan δ) at 90° C. | <0.03 | CEI 60247 |
| Relative permittivity | <2.9 | CEI 60247 |
| Resistivity (continuous current) | $>10^{10}$ Ωm | CEI 60247 |

TABLE 2-continued

| Property | Limit | Trial Method |
|---|---|---|
| Calorific capacity at 20° C. | $>2'000\ J \cdot kg^{-1} \cdot K^{-1}$ | ASTM E 1269 |
| Thermal conductivity at 20° C. | $>0.20\ W \cdot m^{-1}\ K^{-1}$ | Hot wire |
| Dilatation coefficient | $\leq 8.10^{-4}\ K^{-1}$ | ASTM D 1903 |
| Kinematic viscosity at 100° C. | $\leq 4\ mm^2\ s^{-1}$ | ISO 3104 |
| Kinematic viscosity at 40° C. | $\leq 20\ mm^2\ s^{-1}$ | ISO 3104 |
| Kinematic viscosity at 0° C. | $\leq 100\ mm^2\ s^{-1}$ | ISO 3104 |
| Kinematic viscosity at −30° C. | $\leq 3'000\ mm^2\ s^{-1}$ | ISO 3104 |
| Flow point | $\leq -30°$ C. | ISO 3016 |
| Flash point (closed vase) | >250° C. | ISO 2719 |
| Fire point (open vase) | >300 C. | ISO 2592 |
| Acid index | $<0.1\ mgKOH \cdot g^{-1}$ | ISO 660 |
| Primary biodegradability at 21 days | >90% | CEC L-33-A-94 |

Various advantages and features of the invention will be illustrated further in detail by the illustrative examples provided in the Example section.

A typical average UHOC composition of the invention is provided below:

| Oleic acid | C18:1 | about 88% |
| Linoleic acid | C18:2 | about 3-4% |
| Linolenic acid | C18:3 | <2% |
| total saturates | C16:0 through C24:0 | about 5 to 6% |

Other high oleic oils also suitable for the invention have the following compositions:

TABLE 3

| Fatty acid composition | High oleic soybean oil (in %) | High oleic sunflower oil (in %) |
|---|---|---|
| C16:0 | 6.4 | 3.0 |
| C18:0 | 3.3 | 4.3 |
| C18:1 | 85.6 | 87.0 |
| C18:2 | 1.6 | 4.1 |
| C18:3 | 2.2 | 0.0 |

As shown on FIG. 1 and example 14, the compositions as defined in the present application bring clear advantages over the prior art compositions, for example according to WO 2004/108871. Notably by reducing the proportion of polyunsaturated acids, one improves the antioxidant characteristics of the composition, while still maintaining or improving its other beneficial properties of low viscosity and low oxidation thus improving the overall characteristics of the product.

Table 4 hereunder gives additional sources of oil whereby a selection is done based on desired invention composition properties.

TABLE 4

| Vegetable oils | Non-edible oils | Animal Fats | Other Sources |
|---|---|---|---|
| Soybeans | Almond | Lard | Bacteria |
| Rapeseed | *Abutilon muticum* | Tallow | Algae |
| Canola | Andiroba | Poultry Fat | Fungi |
| Safflower | Babassu | Fishoil | Micro algae |
| Barley | *Brassica carinata* | | Tarpenes |
| Coconut | *B. napus* | | Latexes |

TABLE 4-continued

| Vegetable oils | Non-edible oils | Animal Fats | Other Sources |
|---|---|---|---|
| Copra | Camelina l | | Cooking Oil (Yellow Grease) |
| Cotton seed | Cumaru | | Microalgae (*Chlorellavulgaris*) |
| Groundnut | *Cynara cardunculus* | | Wood Extracts, Tallol (Tal Oil), Rosin |
| Oat | *Jatrophacurcas* | | |
| Rice | *Jatropha nana* | | |
| Sorghum | Jojoba oil | | |
| Wheat | *Pongamiaglabra* | | |
| Winter rapeseed oil | Laurel | | |
| | *Lesquerellafendleri* | | |
| | Mahua | | |
| | Piqui | | |
| | Palm | | |
| | Karang | | |
| | Tobaccoseed | | |
| | Rubber plant | | |
| | Rice bran | | |
| | Sesame | | |
| | Salmon oil | | |

Mixtures thereof resulting from direct mixing or transesterification, co-transesterification, inter-transesterification, fractioning are suitable sources of triglicerides which comprise middle chain triglicerides (MCT).

As mentioned previously, in another aspect, the invention relates to a process for preparing the composition of the invention. An idea of the invention is to start from a basic preparation process, typically as disclosed in WO 2009/013349, as regards the production method taught, and to essentially improve this described process by, in part, using microwaves as a heating but also conditioning means, as partially taught in WO 2010/124118 to benefit from the advantages taught by this prior art document in respect to the properties of the treated oils. Although the process of WO 2010/124118 relates mainly to a saponification, which is quite a different technical field and effect, it has been demonstrated that the (systematic) use of microwaves as heating assistance means has very good results for the composition of the present invention. The saponification is basically the reaction to avoid in the preparation of the compositions of the invention. Furthermore the involvement of enzymatic entities and microwaves has indeed unique surprising combinatory attributes. Additionally co-current reactions, meaning performing several reactions at the same time, integrated in that the basic process ensure the production of the desired formulation in a single step with improved yield and superior formulation in-use performance.

Both referenced processes WO2009/013349 and WO2010/124118 have been invented to produce significantly different products, respectively biofuels and greases, which specifications are far apart from the requirements of the desired formulations of the invention. The process for production of biodiesels is antinomic to the one for the production of the compositions of the invention, given that for example water and free alcohols are tolerated and sometime beneficial in the production and use of biofuels while they are detrimental in dielectric fluid as electrical performance reducers or pro-fire agents. Therefore both referred processes are unusable, either separated or combined to produce the desired formulations of the invention. For example residual water, free alcohol, oxidation products, free acid, naturally occurring antioxidants levels are tightly specified in the case of the desired formulations of the invention while those entities might be seen as beneficial or much less important in the two cases here referred to. Given those accurate specifications, it is not conceivable to use for example the microwave (also referenced in the present description by the abbreviation "MW") conditions defined for grease manufacturing or the residence times at elevated temperatures used for biofuels production in the process of the invention to produce compositions according to the present invention. Especially the prolonged MW exposure, as used in the grease manufacturing of WO2009/013349, can be very destructive in terms of the essential properties retention of the desired formulations of the invention.

Diffusivity, inter-solubility of the reacting materials, alignment of preferred compositional entities, pre-conditioning of the chemical environment, avoidance of the formation or elimination of competitive but non productive species, selective thermal and non thermal micro-waves interactions are some of the educated reasons, which may give only a partial and non binding answer to the surprising results.

A particular advantage of the micro-waves is that they heat the product from within and at a lower temperature such that the product qualities are maintained, even after heating. The proposed formulation appeared especially suitable to optimize that effect, thus leading to a higher yield in a shorter time laps. As guidance, reactions occurring in 2 hours occur in less than 5 to 10 minutes with an improved yield in the preferred media with a 10× reduction of non productive side reactions.

Furthermore the preservation of the integrity and properties of the oil components, which have a beneficial, or at least a non detrimental effect, on retention properties such as thermo-oxidation resistance, is achieved via the on-line microwave exposure at all needed steps and levels of the process. The MW exposure and assistance conditions need to be appropriately tailored for each step.

Particularly sensitive chemical families are for example the tocopherols, tocotrienols and the sterols, naturally occurring in the selected components of the ingredients used to make the invention formulations. Not all the sub-categories of those families present the same beneficial trait and therefore the MW conditions are to be further set accordingly. The entire oxidation immune system of the oil in the seed, comprises multiple entities and interactions among those, and therefore is to be considered as a whole while the contribution of each component remains largely unknown.

A Tocopherol and sterol chemical profile of a mid oleic (60%) canola oil is provided in Table 5 below. Tocotrienols, pertaining to the vitamin E family as well, are not shown in that table but are rare and valuable elements in the naturally occurring anti-oxidation system. Values are fully representative of UHCO but the chemicals are about the same therefore representing part of the oxidation immune system of the UHCO oil.

TABLE 5

| Tocopherols Profil | | | |
|---|---|---|---|
| Alpha Tocopherol | NF ISO 9936 | mg/kg | 272 |
| Beta Tocopherol | | | <5 |
| Gamma Tocopherol | | | 407 |
| Delta Tocopherol | | | 8 |
| Sterols Profil | | | |
| Sterols total | | g/100 g | 0.83 |
| Cholesterol | NF ISO 12228 | % | 0.5 |
| Cholestanol | | | <0.1 |
| Brassicasterol | | | 11.7 |
| 24-Methyl Cholesterol | | | <0.1 |
| Campesterol | | | 36.3 |

TABLE 5-continued

| | |
|---|---|
| Capestanol | <0.1 |
| Stigmasterol | 0.5 |
| D7 Campesterol | <0.1 |
| D5,23-Stigmasterol | <0.1 |
| Clerosterol | 0.7 |
| Sitosterol | 46.8 |
| Sitostanol | <0.1 |
| D5-Avenasterol | 2.7 |
| D5,24-Strigmastadienol | 0.5 |
| D7-Stigmasteriol | 0.2 |
| D7-Avenasterol | <0.1 |

Accordingly, the process to prepare fatty acid esters which can be used as a dielectric composition, prepared from whole oilseeds and/or oil components, detailed hereunder and in the example section.

Said process comprises the following steps:
a. Preheating the whole non-hulled ultra-high oleic (UHO) or high oleic (HO) seeds, said preheating being made essentially via microwaves (MW);
b. Flattening the oilseeds and forming a layer with their husks, preferably under micro-wave (MW) assistance,
c. Drying the flattened seeds so as to obtain a water and volatile matter content of between 0.05 and 2.5%, preferably between 0.5% and 1.5%, under micro-wave (MW) assistance;
d. Transesterification/co-transesterification by contacting the flattened, dried seeds and/or oil component with an alcohol medium in the presence of a catalyst, preferably under micro-wave (MW) assistance;
e. Separating the liquid and solid phases resulting from transesterifications preferably under micro-wave assistance;
f. Neutralizing the liquid phase derived from step e); preferably under micro-wave assistance; and
g. Removing the alcohol and separating the glycerin from the fatty acid esters, preferably under microwave assistance.

These steps will be referred to later in the Description by their corresponding letters a-g.

One advantage of the use of micro waves to condition the whole non-hulled UHO (Ultra High Oleic) or HO (High Oleic) seeds is that this process allows to "break" or "open" their husk which simplifies the next step of flattening the oilseeds. Such flattening step may therefore be seen as an arrangement of the heated seeds in view of the next step of the process.

In addition to step (d), one may also add a step of co-transesterification whereby the oil prepared is mixed for example with another oil (component), another fatty acid yielding the desired monoester, or a monoglyceride or diglycerides, having predetermined characteristics, mentioned above as "modified oil X" versus "non-modified oil X". The co-transesterification in the invention is generally conducted once the oil has been partially transesterified from the seed, such as 50% of the seed transesterification has occurred, then another oil, is added to the reacting medium and is being transesterified co-currently while the first oil transesterification still proceeds. Naturally occurring versus synthetic species are interchangeable entities but some process tuning is required to run them separately or co-currently.

The seeds are preferably chosen from among plant seeds which can be cultivated. For example use may be of canola, jatropha seed, groundnut, castor bean, sesame seed, sunflower seed, safflower seed, soybean, lupin seed, camelina seed, cotton seed. Other preferred seeds are sunflower seeds and jatropha seeds. In the scheme of the invention, germs, pips, kernels, and nuts also come under this category. More preferably the seeds are canola. Other suitable materials are given in Table 4 above.

In the method subject of the present invention, the seeds can be used with all or a large part of their husk. In the meaning of the present invention "oilseed" designates the whole seed or the seed rid of part of its husk. For example, with regard to canola, sunflower seed and jatropha seed, the seed is preferably used essentially whole i.e. with at last 80% of its husk. This forms an advantageous fibrous support which can avoid disintegration of the flattened seed when contacted with the alcohol medium during the transesterification and/or co-transesterification step d).

However, if the husk is too voluminous compared with the fruit (for example macadamia nut, Brazil nut, andiroba nut, coconut, shea nut or cupuacu nut) it is preferable to rid the seed of part of its husk so as not to perturb the transesterification reaction. It may also be advantageous to conduct prior crushing of the seeds if they are of large size (e.g. for the macadamia, Brazil, andiroba nuts, coconut, shea or cupuacu nut).

According to step b) of the method subject of the present invention, the oilseeds are flattened. They are then generally in the form of a thin elongate sheet, flake or chip. Equipment such as calendering rolls and equivalent laminating means, press belt, screw press can be used to do part or the totality of step b). Those mechanical means assisted with micro-waves (MW) constitute preferable options compared to the equivalent traditionally heat assisted operations.

Before the flattening step, the seeds are preferably cleaned and predried i.e. rid of their solid impurities such as stones, rags, sticks, metal particles, dust; said predrying being made essentially via microwaves.

The thickness of the flattened seeds largely depends on the final formulations specifications such as the proportion of in-line formed esters.

The oilseeds may be preheated at a temperature of between 30° C. and 70° C., preferably 45° C. before carrying out the flattening step b) so as to increase their plasticity. The MW assistance was found very suitable to obtain the proper seed plasticity and more generally visco-elasticity given the ability of MW waves to reach the heart of the seed and interact with the most important molecular entities much more uniformly than by traditional heating which tends to promote the formation of a peripheral crust such as in baking.

For this purpose, and for illustration purpose only, the oilseeds can preferably be heated at a temperature of between 45 and 75° C. for 5 to 60 min, preferably for 5 minutes with the MW assistance, compared to 30 minutes with traditional heating device, before conducting the flattening step b). Furthermore the MW assistance cancels out the need for an optional treatment under water vapour. Water being a key reaction product which need to be controlled precisely for dual reasons associated with the reaction per say and the final formulations versus its use as dielectric.

According to the present invention, flattening of the oil seeds is advantageously achieved using rollers, calendering rolls and equivalent laminating means, press belt, screw press is specifically engineered pitch pattern distribution along the screw.

Due to the MW assistance, the diameter and the speed of the rollers are no longer as critical in avoiding the fractioning of the seeds. This drawback is generally unaccounted with the referenced process of publication WO 2009/013349.

According to one particular embodiment, flattening of the oilseeds is achieved using smooth rollers preferably in a single pass or belt pressing capable of suitable shearing rates achievable with relative speeds control and tension of the upper and lower tensioned belts and/or surface pattern of the belt, and/or roll path configuration such as serpentine press configuration.

The assistance of MW in flattening step b) is an essential step in the method, since it allows a significantly higher yield than without any flattening, i.e. a better transesterification and/or co-transesterification yield and a better overall extraction yield.

After the flattening step, the seeds must be dried as quickly as possible to stop enzymatic activity and thereby avoid degradation of their content matter. The drying step c) is therefore conducted immediately after the flattening step b). Also, by means of the drying step, it is possible to store the flattened seeds before subjecting them to the transesterification step d). Drying of the flattened seeds is performed so as to obtain a water and volatile matter content of between 0.05 and 2.5%, preferably between 0.5% and 1.5%. This operation is best performed via MW assisted drying which is faster and more uniform, avoiding excessive heating and overshooting while still halting the detrimental enzymatic activity. Once more drying time is considerably shortened; water control is much more accurate and more easily tuned to the dryness target, which generally is affected by seasonal variations of the seed supply characteristics.

Generally, the vegetable oil and alcohol must be as anhydrous as possible, and the oil must have low free fatty acid (FFA) content because the presence of water and/or free fatty acid promotes saponification, which is a side reaction.

The water and volatile matter content of the dried seeds is assayed using NF V 03-909 or CEI 60814 test methods or equivalent.

According to one particular embodiment, the drying step c) is performed under a MW setting to achieve temperature of between 50 and 100° C., preferably between 70° C. and 90° C.

After the drying step c), a transesterification and/or co-transesterification step is conducted by contacting the flattened, dried seeds with an alcohol medium in the presence of a catalyst. The catalyst may be basic or acid, preferably basic, or enzymatic. The catalyst can be solid or liquid. Also of practical limitations in the invention context the transesterification and/or co-transesterification can be conducted under supercritical conditions such as supercritical CO2.

The alcohol medium may comprise one or more alcohols chosen from among the C3 to C12 preferably C8 branched alcohols such as 2-ethyl 1-hexanol, optionally in a mixture with one or more aliphatic hydrocarbons such as hexane and/or osioctane to add a favorable co-solvent effect in terms of extractability and to avoid surface inhibition in the case of enzymatic catalyzed reaction. Tert.-butanol has a stabilizing effect on the enzyme. The alcohol medium is preferably 2-ethyl 1-hexanol containing a quantity of water of less than 1000 ppm, preferably less than 500 ppm. The alcohol medium may be selected such that the resulting ester exhibits a pour point lower than −10° C. and a fire point higher than 250° C.

As per an educated but not binding guidance, the branched structure of the alcohol tends to contribute to the improving of the pour point by affecting the crystal/gel formation and offering a lower viscosity at lower temperatures while the length of the carbon chain tends to favor a higher flash point. Both aspects are desirable for the targeted applications, then a compromise will be made which compromise is facilitated by the nature of the invention process, which enables flexibility such as co-transesterification and MW assistance.

Other suitable alcohols are polyols such as:
Ethane 1,2 diol
Propane 1,2 diol
Propane 1,3 diol
Methyl-2 propane 1,3 diol
Dimethyl 2,2 propane 1,3 diol
Ethyl 2 propane 1,3 diol
Diethyl 2,2 propane 1,3 diol
2 butyl 2 ethyl propane 1,3 diol
Butane 1,4 diol
Pentane 1,5 diol
Methyl 4 butane 1,4 diol
Pentane 2,3 diol
Hexane 1,6 diol
Octane 1,8 diol
Decane 1,10 diol
Dodecane 1,12 diol
Octadecane 1,12 diol
Trimethylol propane (TMOP)
Pentaerythrol
Dipentaerythrol
Neopentylglycol (NPG)
Phtalyl alcohol
Isophtalyl alcohol
Terepthalyl alcohol
Diglycerol (linear and cyclic)
Triglycerol
dihydroxyacetone
1,4 cyclohexane dimethanol
bisphenol-A
Isosorbide
2,5 bis(hydroxymethyl)tetrahydrofurane
2,5 bis(hydroxymethyl)furane
1,8 terpine
1,8 terpineol The basic catalyst is preferably anhydrous and homogeneous and can be chosen from among sodium hydroxide, potash, sodium or potassium carbonate or hydrogen carbonate, sodium or potassium carbonate, sodium or potassium methylate or ethanolate.

The acid catalyst may be sulphuric acid for example.

Heterogeneous conditions using solid catalysts, including nano dispersed catalyst such as nano MgO (of about 60 nm particle size), are usable as well while causing in some cases a more difficult separation of the solids versus liquid phases.

In the case of enzymatic catalyzed, or equivalently chemo-enzymatic, transesterification or co-transesterification, the following illustrative conditions were adopted:
  Using Novozym 435, *Candida Antartica*, which was found to reduce the activation energy needed for the reactions thus producing minimal by-products.
  Novozym 435 is formulated with ethyl acetate, formic acid and hydrogen peroxide (all here before ingredients are available from Sigma-Aldrich for lab purpose).

The reaction is conducted at a temperature range from 45 to 75° C. more easily adjustable by MW assistance as follows:

MW power settings equivalent to 2.5 minutes at 270 W or 3.5 min at 90 W for a 65° C. temperature target or MW power settings equivalent to 3 minutes at 270 W or 4 min at 90 W for a 75° C. temperature target.

Infrared temperature checked is performed continuously.

More examples are detailed in the dedicated section.

*Candida Rugosa* is also a suitable enzyme under temperature conditions set between 35 and 55° C.

Suitable enzymes are produced intra- and extracellular in several microorganisms, for instance, in *Candida, Candida antarctica, Thermomyces lanuginosus, Rhizomucor miehei* and in the bacteria *Bukholdeira cepacia, Pseudomonas alcaligenes, Pseudomonas mendocina, Chromobacterium viscosum.*

Non-immobilized lipases are, in terms of cost-performance ratio, the most preferable enzyme family.

The term "lipase" as used herein refers to enzymes which are capable of hydrolysing carboxylic ester bonds to release carboxylate (EC 3.1.1). Examples of lipases include but are not limited to triacylglycerol lipase (EC 3.1.1.3), galactolipase (EC 3.1.1.26), phospholipase (EC 3.1.1.32).

The lipase may be isolated and/or purified from natural sources or it may be prepared by use of recombinant DNA techniques.

Preferably the lipase is selected from the group comprising triacylglycerol lipase, galactolipase, phospholipase.

More preferably the lipase(s) may be one or more of: triacylglycerol lipase (EC 3.1.1.3), phospholipase A2 (EC 3.1.1.4), galactolipase (EC 3.1.1.26), phospholipase A1 (EC 3.1.1.32), lipoprotein lipase A2 (EC 3.1.1.34).

The lipase may be a variant or derivative of a natural lipase.

For some aspects, preferably the lipase is a triacylglycerol lipase, or a partially active triglyceride enzyme.

Preferably the lipase is added in a substantially pure and/or substantially isolated form.

Lipases that are useful in the present invention can be derived from a bacterial species, a fungal species, a yeast species, an animal cell and a plant cell. Whereas the enzyme may be provided by cultivating cultures of such source organisms naturally producing lipase, it may be more convenient and cost-effective to produce it by means of genetically modified cells such as it is described WO 9800136. The term "derived" may imply that a gene coding for the lipase is isolated from a source organism and inserted into a host cell capable of expressing the gene. WO 02/03805 teaches some of the sources of lipases. For some aspects of the present invention the lipase may be Novozymes 435 (supplied by Novozymes) or a variant thereof.

As an example of an industrial microwave installation suitable for use in the method of the present invention, one may refer for example to the installation described in publication WO 03/050345. Specifically, the microwave reactor suitable here, as an example, is the reactor described in this prior art document. Typically, such a microwave reactor produces an electromagnetic field. "Microwave", as used herein, means electromagnetic radiation in the range of frequency from 5 MHz to 500 GHz. Because of Government regulation and the present availability of magnetron power sources, the frequency normally is 915 or 2450 MHz for industrial applications. The microwave reactor suitable here is a single mode microwave reactor with a cylindrical geometry. This circular cross section reactor, depicted in FIGS. 2 and 3 of WO 03/050345 combines the radially symmetric electromagnetic field distributions and the well defined axial electromagnetic field profile. An example of a particularly suitable reactor for the invention is the single mode TM010 (Transverse Magnetic 010 mode) cylindrical resonant cavity, described in A. C. Metaxas and R. J. Meredith, Industrial Microwave Heating, Peter Peregrinus Ltd., London, England, 1983, pp. 183-193, equipped with an American Microwave Technology (AMT) solid-state amplifier as microwave power source, 32.7 cm wavelength, powered from a 28 VDC power supply and with a maximum power level of 400 W, with dimensions of an inner length (L) of 30 cm and an inner radius (R) of 12.5 cm and generating a resonant frequency of 915 MHz.

Milestone Inc., Monroe Conn., USA's microwave chamber reactors are also suitable to perform the trans and co-trans esterification. The Ethos series is particularly suitable due to its accurate temperature, pressure, wattage and power settings needed for simulation.

Any other equivalent device may of course be used to carry out the present invention as long as validated via preliminary exploratory testing.

Throughout the process. MW assistance eliminates temperature overshooting, uncounted with traditional heating means.

Maxwell's equations of electromagnetism can be used to orient the prediction of microwave heating and absorption and diffusion of heat by the material.

The enzymatic MW assisted transesterification and co-transesterification were beneficial to the dielectric properties, the oxidation resistance and residual acidity of the desired formulations when compared with conventional heating and acid or base catalyzed reactions.

The non thermal effects (opposed to the strictly called thermal effects) of the MW assistance are believed to be part of the surprising reaction efficiency in general and a yield above 95% within a considerably reduced time of minutes versus hours (or for example 1 hour versus 5 hours pending on the treated quantity). For example under MW assistance the molecule collision and orientation have extra driving force compared to conventional heating. The lock-key effect, promoted by the MW assistance, between the enzyme and the reacting entities is believed to be additionally favorable.

The cold flow behavior of the formulations were believed to be improved due to the non thermal effects of the MW assistance especially avoiding or eliminating the dimerization of the triglycerides such as in the case of HO soybean and UHO canola components and their oils therewith. MW vibrations typically affect the crystallization thermodynamics to the extent that up to 5° C. to 10° C. pour point depression can be obtained via the process of the invention, which is surprising and very favorable to the desired formulations' application.

The reduction of the water interaction was found to be a significant element in the production of the desired formulations via the enzymatic route, both with regard to the stability and the purification process. It may be necessary, pending on process settings and supply characteristics, to add only some % water during the enzymatic reaction. Examples are provided to that effect.

Given the hydrophilic nature of some reacting entities, such as the alcohol including the glycerol, and the hydrophobic nature of some others, such as the oil, it was found beneficial to promote the surface regeneration of the enzymatic medium to avoid its surface inhibition by a monolayer of one of the preferred entities leading to, for example, mass transfer resistance. Such regeneration can be accomplished by shearing in between belts, such as in a belt press, or physical rearrangement/disturbance of the reacting bed by means of interruptors such as in a screw press discontinuities created in the pitch of the screw. Surface rinsing may be suitable as well. The surface regeneration of the catalyst is much less critical in the case of MW assisted conditions given the non thermal effects of the MW treatment at the molecular level, such as rotational effects, favorable arrangements of entities, statistical collision frequency and lower activation energy needed.

At selected stages of the process the use of an inert blanket of gas, such as nitrogen, might be used to get even purer formulation grades pending on requirements of the electrical transformation, for example.

Before starting the transesterification step, it may be advantageous, preferably under batch condition, to first place the flattened seeds in contact with the alcohol medium, so as to impregnate them with this alcohol medium and promote subsequent transesterification. Pre-impregnation can be conducted at a temperature of between 40 and 80° C. This step is preferably MW assisted.

In the case of more traditional catalysis, such as with KOH or NaOH catalysts the following illustrative conditions appeared to yield desired results.

To optimize the yield of the transesterification reaction, the weight ratio of catalyst/flattened seeds is preferably between 0.5% and 2.5%, and/or the weight ratio of alcohol/flattened seeds is preferably between 100/100 and 500/100. When referring to oil, 1% by weight of catalysts and 6:1 alcohol to oil are preferred ratio.

The MW assistance is performed by irradiation by microwave field of the resulting blend typically, and only for illustrative purpose, for an equivalent exposure of 3 to 5 min under a 1200 W setting. The preferred temperature range is 30 to 50° C. Yield exceeds 95% under those conditions.

Under those non limiting conditions, 35° C., is a preferred temperature in the case of NaOH.

Comparatively, with conventional heating, the transesterification/co-transesterification reactions are advantageously conducted at a temperature of between 45 and 55° C., preferably at around 50° C., for a time of 20 min to 2 hours.

In practice the contacting of the flattened seeds with the alcohol medium at the transesterification step d) is conducted by sprinkling, or by injection into, a bed of flattened seeds, having a height tailored to meet the desired formulations specifications and productivity therewith. Similar methods are used to ensure the complementary co-transesterification reactions using sprinkled or injected components which yield the desired formulation composition in terms of monoesters and oil components.

Examples in the dedicated section further underline the additional benefits of using MW assisted conditions, which is a generalized practice of the invention throughout the entire process.

After the transesterification/co-transesterification step, the liquid and solid phases resulting from said transesterifications are separated, preferably by draining, pressing, centrifugation or generally-used solid liquid separations. The liquid phase collected contains the fatty acid esters produced by the transesterification reactions.

To collect the remainder of the fatty acid esters present in the solid phase, it is possible to conduct the following additional steps:

h) alcohol extraction of said solid phase derived from step d);
i) collection of the solid phase;
j) filtration and grouping together of the liquid phases derived from the transesterifications step e) and extraction step h).

The grouped liquid phases derived from step e) can be filtered, or ultra-filtered using various membranes to eliminate fines or small particles.

The extraction step h) is preferably conducted by counter-current percolation with the alcoholic media or chosen from among the C1-C12 alcohols, with a weight ratio of alcohol/flattened seeds of between 100/100 and 200/100, having a water content of less than 1000 ppm, preferably less than 500 ppm.

The liquid phase derived from step e), optionally supplemented with the liquid phase derived from extraction step h), is then neutralized either using an acid if the reaction catalyst is basic, or with a base if the reaction catalyst is acid.

The acid is preferably chosen from among sulphuric acid, hydrochloric acid, phosphoric acid, citric acid or acetic acid.

The base may be sodium hydroxide or carbonate for example.

The quantity of acid added to the liquid phase is preferably determined so that the fatty acid content of the fatty acid ethyl esters remains less than the desired acid number of the formulation, for example 0.1% (or an acid number <0.1 mg KOH/g as indicated in Table 1).

Neutralization of the liquid phase is performed in part so as not to increase the quantity of soaps therein.

After the neutralization step f), the alcohol medium is then removed from the liquid phase and the glycerin is separated from the fatty acid esters.

The alcohol is preferably removed by evaporation at a suitable temperature pending on the reacting alcohol medium used under reduced pressure such as between 200 and 1000 mbars, alternatively at around the boiling point of the selected alcohol under atmospheric pressure, until a residual alcohol content close to alcohol free level is obtained. This operation is conducted preferably under MW assistance The separation of the glycerin from the fatty acid esters is preferably carried out by centrifuging, for example at 1200 RPM, for 10 min as a guiding duration, at a temperature of between 60 and 80° C. preferably under MW assistance. It may also be carried out by static decanting. The glycerin carries with it a large part of the impurities such as the catalyst, soaps, phosphoric derivatives or sodium sulphate.

The fatty acid esters are then advantageously further washed with water, preferably at around 80° C. to fully remove the impurities, and then separated from the washing water notably by decanting or centrifuging, preferably at around 80° C., under MW assistance, then dried preferably by evaporation at a temperature of between 90 and 100° C. under a pressure in the order of 200 mbars, until a residual water content of less than 200 ppm, preferably less than 100 ppm, is obtained relative to the total dry matter; thus meeting the desired specifications of Table 1. The fatty acid esters thus obtained can then be packaged under nitrogen after being cooled.

Preferably, softer techniques are used, such as: Molecular sieves can be used to meet the desired specifications in terms of water for example.

The various liquid separations and impurity removal mentioned above can be carried out on selective membranes such as denser non porous polymeric composite membranes, reverse osmosis and nano-, ultra- or micro-filtration.

By contrast with conventional physical purification refining using a membrane process is remarkably simpler and offers advantages such as lower energy consumption, ambient temperature operation, no addition of chemicals, retention of all the desirable components of the oils such as the one contributing to higher oxidation resistance such as tocopherols, tocotrienols and sterols.

Additional oxidation products, which are undesirable are generally rejected by those membranes such as, but not limited to, NTGX membrane series from Nitto Denko, Kusatsu, Japan, more specifically NTGX-AX and NTGX-2200. NTGX membranes are hydrophobic membranes made of an active silicon layer and a polyimide or polysulfone supporting layer. They proved to be efficient with formulations of the invention based on sunflower, canola or soybean oil and mixtures thereof. Whenever judged necessary the MW assistance can be used and further support the soft handling of the invention formulation to preserve its naturally occurring beneficial components and to meet the tight formulation specifications for example in terms of water, free alcohol, free acid and oxidation products.

At any stage of the process naturally occurring or synthetic additives can be re-added or added to perfect the desired formulations. For example a blend of semasol and gamma tocopherol was found beneficial to the oxidative resistance of the desired formulations, typically 200 to 600 ppm of gamma tocopherol and 50 to 500 ppm of sesamol, from sesame seeds (*Sesamum indicume* L. or as a standard of sesamol from Sigma Aldrich Chemical Co.) constitute a suitable blend, which additionally has superior performance that the equivalent amount of separated ingredients. Viscosity improvers, pour point depressants, flash point enhancers, corrosion inhibitors and other traditionally incorporated additives, can be added at any stage as well.

The examples, values and method steps given are only for illustrative purposes and should not be construed in a limiting manner. Different embodiments of the invention may be combined together according to circumstances. In addition, other embodiments may be envisaged within the spirit and scope of the present invention, for example by using equivalent means, values, materials or steps. Singular and plural can be used interchangeably unless otherwise specified, e.g. the formulation of the invention and the formulations of the invention are equivalent.

Although transformers were mentioned as possible devices using the composition of the invention, other devices are of course possible, for example such as generators, capacitors, inverters, electric motors, switches and cables. More generally the use of the desired formulation as a heat-transfer dielectric fluid in a device to generate, store, convert and/or distribute electrical energy.

EXAMPLES

The thermal-oxidation properties of the oil compositions were measured according to the HAAC (Hazard Analysis and Critical Control Point) ISO 9000 regulations using the Testo 270 (Test INC, 40 White Lake Rd., Sparta, N.J. 07871, USA), oil tester. The TPM (total polar materials) value readily provided by the equipment was used to define the oxidation percentage of the compositions (oxidation %=TPM reading on Testo 270). This type of oil tester, equipped with an inter-digital capacitor which measures the electrical property of the oil in terms of its dielectric constant, is especially suitable to outline the benefit of the invention in the selected fields of application. A ceramic material is used as the carrier material for the plate interdigital capacitor to which the gold strip conductors have been attached using a special process as per U.S. Pat. No. 6,822,461.

More traditional indirect chemical methods such as OSI (AOCS), ASTM D2440 or Rancimat EN14112 are not well defined for the type of electrical applications and formulations covered in this invention and therefore are not providing as reliable comparison. There is no proven correlation between performance in those tests (OSI & D2440 & EN14112) and performance in service.

U.S. Pat. No. 6,822,461 covers the selected type of oil tester and its probe in greater details. Calibration of the Testo 270 is regularly performed by an authorized calibration center and confirmed prior to every measurement using the calibration oil for that purpose. The sensor takes a certain time to equalize the temperature. The Testo 270 has a response time of about or less than 20 s dipped in the oil once the capacitive probe is immersed. When the measurement has reached a stable value, the user is given an audible signal to indicate this. The measured value is shown on the display and directly computerized as a function of the time that the sample has been in the oven at the set selected temperature of 170 degree Celsius.

FIG. 1 provides all the relevant measurements of the oxidation % versus time for the comparative examples of the invention and the preferred embodiments.

Comparative Example 1

The closest high oleic oil composition to the most preferred composition of the embodiment of WO 2004/108871 served as a comparative material to demonstrate the inventive steps of the invention.

Commercially available from DOW Inc. or Monsanto Inc., the high oleic content canola/rape seeds were expressed as traditionally known in industrial processes and refined according to RBD (Refining Deodorizing and Bleaching) industrial chemical procedures. Such a RBD process is described in Example 3. The resulting commercial oil was used. Natreon® and Cabriolet® are representative brands as well as newer high oleic ones. Following composition, properties and statistics have been measured.

TABLE 6

Composition of Comparative Example 1 oil

| Composition | C16:0 | C18:0 | C18:1 | C18:2 | C18:3 |
|---|---|---|---|---|---|
| % weight | 4.98 | 1.68 | 74.53 | 14.50 | 4.30 |
| LSD* P 0.05 | 0.188 | 0.071 | 1.254 | 0.741 | 0.479 |
| CV % | 2.64 | 2.84 | 1.16 | 3.6 | 8.17 |

*LSD: Least Significant Difference
(notation Ca:b or Ca-b is a fatty acid having a carbon atoms and b unsaturation(s); values are percentages by weight relative to the total weight of fatty acids in esters)

Physical Properties of Example 1 Oil
Appearance: Light amber
Colour: 2.5
Odour: Mild
Spec. gravity 15° C.: g/cm$^3$ 0.917
Refractive index: 1.472
Viscosity 40° C.: mm$^2$/s 36
Viscosity 100° C.: mm$^2$/s 8.2
Viscosity index: 215
Neutralisation number mg KOH/g 0.3
Iodine number: mg I$_2$/g 102

A fraction of the above rapeseed oil was transesterified with 2-ethyl-1-hexanol (2-EHA), so as to convert the triglycerides present in the oil to esters of 2-ethyl-1-hexanol (2-EHO). Glycerol was removed from the medium. A mixture of 2-ethylhexanol esters with the same fatty acid composition than the rapeseed oil was obtained.

Blending 25% of the 2-ethyl-1-hexanol ester of the oil of the comparative example 1 with the selected oil of the comparative example 1 yielded the dielectric composition of the comparative example 1.

The following chemical process was used to prepare the 2-EHO of the oil of the comparative example 1.

Chemical Process to Prepare the 2-EHO

The 2-EHO is prepared by the base catalyzed transesterification of a high oleic vegetable oil (e.g. rapeseed, canola) with 2-ethyl-1-hexanol (2-EHA) at about 80° C. The process uses a large excess of 2-EHA, which is recovered by distillation. The by-product from the reaction is glycerol, which readily phase separates from the product. The product is purified by several washings with water and drying under vacuum with a nitrogen sparge. The sparge helps remove residual 2-EHA.

Here is an example of the mass balance for the above reaction:

TABLE 7

Representative reactor loads for 100 kg vegetable oil feed

| Reactants | Quantity (kg) |
|---|---|
| Oleic Rapeseed oil | 100 |
| 2-EHA | 88.6 |
| KOH | 0.6 |
| Products | |
| Esters 2EHO | 133.9 |
| Glycerol | 10.5 |
| Excess 2EHA | 44.3 |
| Other | |
| Water per wash | 26.8 |
| Target 2-EHA 1$^{st}$ distillation with 7% residual 2-EHA | 34.1 |

Example 2

The Ultra High Oleic Canola (UHOC) oil of the preferred embodiment of the invention was obtained from a blend of 243 batches of Canola seed according to the hybrid cultivation method described in WO0051415 and U.S. Pat. No. 6,323,392.

This method aims at providing an improved plant breeding process for forming Brassica napus $F_1$ hybrid seed having an enhanced commercial value attributable to a combination of (1) the atypical fatty acid profile of the endogenously formed seeds, and (2) the seed yield.

U.S. Pat. No. 6,323,392 invention also provides an improved plant breeding process for forming Brassica napus $F_1$ hybrid seed which exhibits a highly elevated oleic acid (C18:1) content.

The method of WO0051415 and U.S. Pat. No. 6,323,392 inventions was further adapted to yield a most preferred C18:2 and C18:3 content.

Batch selection and blend of the preferred embodiment of Example 2:

TABLE 8

| Ca-b = Ca:b | C12-0 | C14-0 | C16-0 | C16-1 | C18-0 | C18-1 | C18-2 | C18-3 | C18-2 + C18-3 |
|---|---|---|---|---|---|---|---|---|---|
| Min. | 0.00 | 0.04 | 2.41 | 0.17 | 1.25 | 85.39 | 1.77 | 1.19 | 3.91 |
| Max. | 0.01 | 0.06 | 3.20 | 0.26 | 1.86 | 89.15 | 4.54 | 2.57 | 7.03 |
| Av. | 0.04 | 0.04 | 2.64 | 0.21 | 1.50 | 88.04 | 2.68 | 1.89 | 4.57 |

| Cab = Ca:b | C20-0 | C20-1 | C20-2 | C22-0 | C22-1 | C24-0 | C24-1 | TSATS |
|---|---|---|---|---|---|---|---|---|
| Min. | 0.48 | 1.39 | 0.00 | 0.25 | 0.01 | 0.13 | 0.04 | 4.90 |
| Max. | 0.72 | 1.87 | 0.07 | 0.47 | 0.10 | 0.36 | 0.25 | 6.32 |
| Av. | 0.58 | 1.64 | 0.04 | 0.35 | 0.04 | 0.22 | 0.11 | 5.34 |

(*) TSATS: Total Saturated

The average values (Av.) correspond to the selected seed batch composition used to yield the oil of the preferred embodiment of the invention. The average oil content of the selected seed batch is 43%. The residual water of the selected seed batch was 6.6%

The oil of example 2 is further characterized by a TGA/DSC scan under the following conditions.

Specific conditions and equipment references are provided below.

Equipment: 2960 SDT-CE5275 Ta Instrument (simultaneously performing DSC-TGA—differential scanning calorimetric and thermogravimetric analysis)

Figure 2:
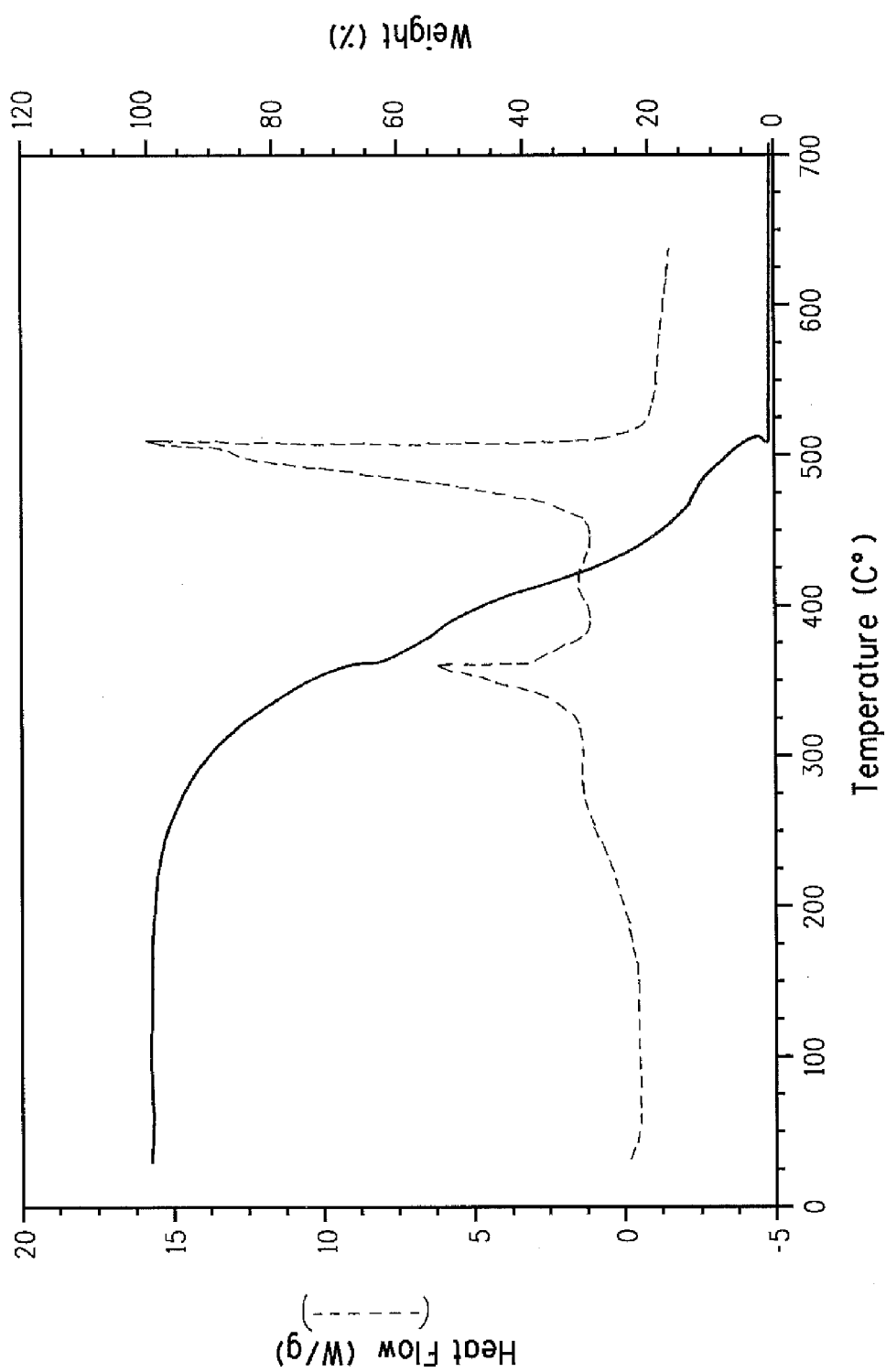
FIG. 2 provides the TGA/DSC scan of the UHOC (Ultra High Oleic Canola) of the invention

Test Conditions:
10° C./min till 650[° C.]
air flow: 100 ml/min
air composition
N2: 78.09%
O2: 20.95%
Ar: 0.93%
CO2: 0.03
FIG. 2: TGA/DSC scan of the UHOC Example 3

Whenever an RBD process was used to refine, bleach and deodorize the oil, the following process sequence applies:

The oil fractions, mechanically and chemically (when applicable) extracted from the seed, are combined and dried under 20 mbar vacuum using a rotary evaporator at 70° C. for 3 hours.

The refining, bleaching and deodorizing are performed in a double jacketed reactor equipped with a mechanical agitator and a reflux condenser.

The refining is performed as per the following steps:
About 4 kg of oil and 2.5% weight of phosphoric acid are loaded in the reactor
The mixture is heating for 30 minutes at 75° C. under 500 rpm
The resulting mixture is cooled down to RT and centrifuged at 1000 rpm
The oil phase is separated by decantation The neutralization and bleaching are performed as per the following steps:

The acid index of the refined fraction is measured according to ISO 660, e.g. 0.64 mg KOH/g. The refined fraction is placed in the reactor For the above acid index example, 0.8% weight of sodium hydroxide are added to the reactor The resulting mixture is heated at 40° C. and washed with deionized water (727 g for about 3600 g of refined oil) under 200 rpm for 15 minutes and the pH is measured The above washing operation is repeated till neutral pH is reached, generally 4 washing sequences with about 725 g of deionized water are necessary for the selected example The resulting neutralized and washed oil fraction (3600 g) is loaded in the reactor with about 10% weight of activated clay (preferably TONSIL bentonite activated clay commonly available on the market)

Under 200 rpm the resulting mixture is heated at 70° C., then the reactor is plugged to a vacuum line set at 50 mbar for 60 minutes maintaining the same stirring level.

Sparged with nitrogen the mixture is transferred for filtration adding to it 5 g of filtration aid (Filtracel EFC 950C)

Finally about 3500 g of neutralized and bleached oil are collected at the end of this operation The deodorizing is performed as per the following steps:

Once heated at 200° C. under 8 mbar vacuum in the reactor, water vapour is injected in the bleached and deodorized oil fraction (3500 g) using a micrometric valve. Injection lasts for about 40 to 45 minutes using about 17 g of vapour.

The resulting RBD oil is stored in UV protecting glass containers under nitrogen blanket.

Example 4

The seed preconditioning preferred embodiment is performed according to the following operations.

Clean and MW (microwave) dried seeds were mechanically flattened:

A close to monolayered canola bed of seeds of example 2 is roll pressed on a paper filtering media using a 15 cm diameter, 15 cm long, 10 kg stainless steel cylinder.

for larger quantities the use of rubberized calendaring rolls is preferred such as:
  using a DAMMAN CROES S.A. International's calendaring equipment, with smooth rollers of 14 cm diameter and 24 cm long, with a roller spacing of lower than 0.15 mm at a speed of 60-70 rpm.

To underline the MW assisted preheating benefit the following experiment was conducted:
  No heating of the seed sample and roll pressing, as per above, is the reference
  Ventilated oven heating of the seed sample till an homogeneous temperature of 100° C. (IR temperature measurement) is reached then roll pressing as per above yielded a 5% oil extraction increase versus the no heating reference
  MW heating of the seed sample for 1 minute at a 900 W setting in a commercial microwave oven (Samsung MW82P equipped with a Triple Distribution System for heating harmonization (T.D.S.)), waiting for 20 seconds for the temperature of the seed to homogenize, MW reheating for 1 minute at 900 W setting, waiting for 20 seconds heat relaxation and roll pressing as per above yielded a 10% oil extraction increase versus the no heating reference. The MW heating time led to an IR measured temperature of the sample of 100° C. uniformly distributed within the sample.

MW assisted preheating is beneficial to the oil extraction yield and to the oil thermo-oxidative properties as underlined in other examples.

The MW assisted preconditioning of the seed is best conducted with industrial scale equipment as indicated in the detailed description.

Whenever applicable in any step of the processing from the seed to the desired formulation (for example a dielectric formulation) as per FIG. 2, MW assistance will be privileged (given the resulting beneficial properties of the formulation).

In a preferred embodiment of this invention, power settings are also used to time-distribute the applied power over a suitable time interval and minimize the potential for localized energy uptake and resulting molecular damage. In an especially preferred embodiment, microwave power is applied to the sample over a series of intervals, with "rest or relaxation" intervals, in which microwave power is not applied to the sample. Power application intervals and rest intervals will be conveniently distributed based on orientation trials. The intervening rest intervals prevent adverse thermal effects and can be as brief as 1-2 seconds.

It is to be understood that in a preferred mode of practicing this invention, these efforts to distribute the applied power over time are to be taken in addition to using suitable "power" settings of the apparatus.

With industrial scale MW equipment those irradiation and relaxation sequences can be computerized and automated.

Example 5

In a preferred embodiment of the invention once the seeds have been preconditioned and flattened as per the teaching of the Example 4, the resulting materials can be used for direct transesterification or used for further extraction—then—used as is—or—submitted to a transesterification reaction of the liquid phase.

Example 5 outlines the further extraction step as performed on the preconditioned and flattened seed materials.

A screw press, Taby 40A, equipped with a heating internal sleeve set to 80° C., was fed with the preconditioned materials. The throughput was adjusted to 0.2 kg/minute. The oil was collected at the peripheral outlet and the solid cake at the tip of the extruding screw. The oil is then filtered using a spin-on type filter, equipped with an 11 micrometre filtration membrane, sparged with nitrogen.

The yield of the overall extraction operation without any optimization was 28% vs the initial weight of seed.

Centrifugation was used as well to separate the oil from the seed cake and produced about the same extraction yield.

Instead of heating the flattened seed material at 80° C. during the extrusion, MW assisted heating at 40° C. of the flattened seed material helped reducing significantly the extrusion temperature yielding better extraction and oil properties. Alternatively the extrusion output was increased and the temperature maintained, still yielding better extraction and oil properties by reducing the residential time. A dryer cake could be obtained with a 2 to 4% reduction of its residual oil content. The MW zo assisted extrusion is believed to provide better and more uniform heating of the oil itself in part given its dielectric constant; this more uniform heat distribution among the seed media also contributes to more plasticity and extrudability of the feed. The solid cake can be further extracted using hexane. The residual oil can be used for various purposes and is generally mixed with the directly extruded fraction. Typically the cake is further dried, preferably under the assistance of MW if the oil is to be used for its dielectric properties, or in a ventilated oven at 90° C. for 12 hours for a cake amount of 6.5 kg. The residual humidity level of the cake is about 1.95% after that step.

A Soxhlet continuous hexane extraction is conducted on the dried cake to remove the residual oil. The receptor/cartridge of the extractor has a 20 l capacity. The condenser and the distillation path secure and permit the continuous extraction. Cake extraction conditions are summarized as follows:
For 6.5 kg of cake,
5 kg of hexane per cycle were used,
4 extraction cycles were performed,
with cake/hexane contacting time per cycle of about an hour,
the final distillation under 20 mbar vacuum lasted 3 hours at 60° C.

An additional 16% of oil was extracted from the cake.

As further demonstrated in subsequent examples, avoiding heat exposure during all the steps of the invention has shown beneficial thermo-oxidative properties of the resulting formulations made from triglyceride sources, such as and most preferably UHOC, both during the extraction and the transesterification steps of the invention. It is believed that the reduced heat further protects the immune oxidation system of the bio-based triglyceride sources. Vitamins are especially sensitive to heat as well as other natural preserving entities. Furthermore solvent extractions as well as chemical processes tend to affect those immune oxidation systems as well.

Mild and clean processes are to be most preferred embodiments of the invention.

Colder pressing is part of those "mild and clean" processes and can be performed by replacing any conventional heating in the extraction process described in the present example 5 by MW assisted heating preferably performed as per example 4; microwave power being applied to the sample over a series of intervals, with "rest or relaxation" intervals.

Example 6

Enzymatic transesterification with non-immobilized lipases at low temperature under MW assisted temperature management.

The three following types of EC 3-1-1-3 non-immobilized enzymes were used to demonstrate the transesterification preferred embodiment of the invention:
LPS 122 is a lipolytic enzyme preparation, from DuPont/Danisco, manufactured by fermentation process from selected bacterial strain of *Pseudomonas cepacia*.
LPS 123 is a lipolytic enzyme preparation, from DuPont/Danisco, manufactured by fermentation process from selected bacterial strain of *Alcaligenes* sp.
LPS 124 is a lipolytic enzyme preparation, from DuPont/Danisco, manufactured by fermentation process from selected fungal strain of *Rhizopus oryzae*.

The general transesterification reaction was conducted as follows:

The transesterification reaction of the selected oil with the 2-EHA was conducted in a double jacketed reactor, equipped with a condenser and a mechanical stirring device. The oil, the 2-EHA and the enzymatic catalysis are mixed at 25° C. and then the temperature is increased to 40° C. The progression of the reaction is measured via GPC performed on samples collected at regular time intervals.

The ingredients amounts involved are:
100 g of oil
58.8 g of 2-EHA hydrated at 0.2% weight unless otherwise indicated
the above corresponds to an alcohol to oil ratio of 4
2 g of enzymatic catalysis equivalent to 2% weight of the oil In the most preferred embodiment of the invention heating or keeping the set temperature constant was performed under MW assistance, as taught in example 4, involving rest-relaxation intervals. The MW assistance led at least to a 10% yield increase, vs. no conventional heating, for a given reaction time prior to the reaction completion. Improved compositions properties were also observed and documented in example 14.

Example 7

Using LPS 122 of Example 6 as an enzymatic catalyst, 100 g of oil from the UHOC seeds of the Example 2 were extracted to perform the transesterification reaction protocol of Example 6.

After a reaction time of 5 hours, the triglycerides (TG) conversion was 45%.

After a reaction time of 150 hours, the triglycerides (TG) conversion was 95.5% with a selective 2-EHO conversion of 72.6%.

No attempt was made to optimize those yields.

Example 8

Using LPS 123 of Example 6 as an enzymatic catalyst, 100 g of oil from the UHOC seeds of the Example 2 were extracted to perform the transesterification reaction protocol of Example 6.

After a reaction time of 4 hours, the triglycerides (TG) conversion was 80%.

After a reaction time of 20 hours, the triglycerides (TG) conversion was 80% with a selective 2-EHO conversion of 77%.

No attempt was made to optimize those yields.

Example 9

Using LPS 123 of Example 6 as an enzymatic catalyst, 100 g of oil of the composition indicated in the table below were used to perform the transesterification reaction protocol of Example 8. The RBD process is similar to the one described in Example 3.

After a reaction time of 1 hours, the triglycerides (TG) conversion was 76.8%.

After a reaction time of 20 hours, the triglycerides (TG) conversion was 96% with a selective 2-EHO conversion of 78.2%.

No attempt was made to optimize those yields.

TABLE 9

| High Oleic Soybean (HOS) Oil from E.I. DuPont De Nemours Inc./Pioneer | |
|---|---|
| Fatty acid | % |
| C14:0 (myristic) | 0.04 |
| C15:0 (pentadecanoic) | 0.03 |
| C16:0 (palmitic) | 6.15 |
| C16:1 n-7 (palmitoleic) | 0.10 |
| C17:0 (margaric) | 0.81 |
| C18:0 (stearic) | 3.85 |
| C18:1 n-9 (oleic) | 77.74 |
| C18:1 (octadecenoic) | 1.30 |
| C18:2 n-6 (linoleic) | 4.20 |
| C18:3 n-3 (alpha-linoleic) | 2.19 |

TABLE 9-continued

High Oleic Soybean (HOS) Oil from
E.I. DuPont De Nemours Inc./Pioneer

| Fatty acid | % |
|---|---|
| C20:0 (arachidic) | 0.39 |
| C20:1 n-9 (eicosenoic) | 0.38 |
| C20:1 n-9 (eicosadienoic) | 0.40 |
| Total polyunsaturates | 6.79 |
| C22:0 (behenic) | 0.01 |
| C24:0 (lignoceric) | 0.16 |
| Others | 0.90 |

The enzymatically catalyzed transesterification of HOS is selective and productive.

Example 10

Using LPS 124 of Example 6 as an enzymatic catalyst, 100 g of oil from the UHOC seeds of the Example 2 were extracted to perform the transesterification reaction protocol of Example 6 where the 2-EHA was hydrated at 1% weight instead of 0.2%. After a reaction time of 200 hours, the triglycerides (TG) conversion was 72% with a selective 2-EHO conversion of 50%.

No attempt was made to optimize those yields.

Among all lipase enzymes tested, as per example 7, 8, 9, 10, the lipase 123 is the most efficient lipase in conversion yield and the most selective to produce the 2-EHO via enzymatic catalysis.

Example 11

A suitable amount of seeds of Example 2, containing 100 g of extractable oil, preconditioned and flattened as per the roll pressing/calendaring procedure of Example 4 was submitted to the transesterification conditions of Example 8. The conversion rates of the TG and 2-EHO were identical to the conversion rates of Example 8.

Before starting the step of transesterification, it was found advantageous to soak the flattened seeds with the alcohol medium, so as to promote the absorption of the alcoholic medium and then further promote the transesterification.

The separation of the solid seed portion was achieved by filtering the reaction mixture on filter paper of 11 microns pore diameter under 0.5 bar of pure nitrogen. Decantation and centrifugation at 1000 rpm were also found suitable.

The separated/purified fatty acid esters were packed under nitrogen after having been cooled.

Example 12

A suitable amount of seeds of Example 2, containing 50 g of extractable oil, preconditioned and flattened as per the procedure of Example 4 was submitted to the transesterification conditions of Example 8.

Once the TG conversion rate had reached 50%, 50 g of soybean oil of Example 9 were added to the reactor and the reaction continued under the same protocol. The global conversion rates of the TG and 2-EHO were identical to the conversion rates of Example 9.

Before starting the step of transesterification, it was found advantageous to soak the flattened seeds with the alcohol medium, so as to promote the absorption of the alcoholic medium and then further promote the transesterification.

The separation of the solid seed portion was achieved by filtering the reaction mixture on filter paper of 11 microns pore diameter under 0.5 bar of pure nitrogen.

Decantation and centrifugation at 1000 rpm were also found suitable.

The separated/purified fatty acid esters were packed under nitrogen after having been cooled.

The procedure outlined above demonstrates that the co-current transesterifications of two oils, one still in the flattened seed cake and one added as a separated liquid, while the first transesterification is still progressing, is producing the desired ester composition with good yield.

Comparative Example 13

In order to evaluate dielectric compositions of the invention made from dielectric compositions of the market, i.e. FR3® from Cargill Inc., commodity soybean oil of the table below, representative of FR3® composition, was submitted to the transesterification protocol of Comparative example 1 (see Chemical Process to prepare the 2-EHO).

TABLE 10

| C16:0 % | C18:0 % | C18:1 % | C18:2 % | C18:3 % |
|---|---|---|---|---|
| 10 | 5 | 21 | 53 | 7 |

Composition of soybean oil of FR3® commercial dielectric compositions

The resulting 2-EHO was blended with FR3® for further testing.

Blending 25% (weight) of the 2-ethyl-1-hexanol ester of the oil of the comparative example 13 with 75% of FR3© yielded the dielectric composition of the comparative example 13.

Example 14

The Thermo-Oxidative Performance Versus Time of the Comparative and Invention Examples FIG. 2 provides a series of thermo-oxidation datasets numbered 1 to 6 and circled, with the corresponding linear regression performed on each family. The slope of this linear computing represents the rate of thermo-oxidation in percentage per hour. For example the dataset numbered 2 has higher thermo-oxidation rate than the dataset numbered 6 given that the slope of the linear regression line of dataset numbered 2 is higher than the slope of the linear regression numbered 6.

The dataset #1 on FIG. 1 corresponds to the comparative example 13.

The dataset #2 on FIG. 1 corresponds to the comparative example 1 with a dielectric formulation representing the preferred embodiment of patent WO2004/108871 made from the seed composition of example 1 which were:
  screw pressed followed by the solvent extraction of the cake as per example 5,
  then resulting oils (from screw pressed oil added to solvent extracted oil of the cake) were RDB refined as per example 3,
  and to said above oils, were added 25% of the corresponding 2-EHO obtained via the chemical process of example 1.

The resulting mixture is the ester composition of dataset #2.

The dataset #3 on FIG. 1 corresponds to an ester composition made from the seed composition of example 1, as a starting oil, which was:
processed as per example 11,
to produce after solid separation a 25/75, 2-EHO/oil ratio, the resulting mixture is the ester composition of dataset #3.

The dataset #4 on FIG. 1, corresponds to the same ester composition than dataset #3 except that conventional heating was, all along the process, replaced by MW heating and MW assisted processing, as outlined in example 4, in a way that all temperatures and/or residential times were reduced to the minimum acceptable versus yields. The resulting ester composition of dataset #4.

The dataset #5 on FIG. 1, corresponds the ester composition comprising 75% of the oil composition of the example 9 and 25% of its corresponding 2-EHO obtained via the chemical process of example 1.

The resulting mixture is the ester composition of dataset #5.

The dataset #6 on FIG. 1 corresponds to the UHOC oil composition of the example 2 as a starting oil:
processed as per example 11,
to produce after solid separation a 25/75, 2-EHO/UHOC oil ratio,
conventional heating being, all along the process, replaced by MW heating and MW assisted processing in a way that all temperatures and/or residential times were reduced to the minimum acceptable versus yields.

The resulting mixture is the ester composition of dataset #6.

Dataset #1, #2, #5 of FIG. 2 have been processed in the same way to yield a 25/75 weight % (2-EHO/oil) ester composition. The difference between those 3 datasets is the starting oil composition: a commodity soybean oil, i.e. FR3© commercial dielectric oil, being used in Dataset #1, a high oleic canola oil, HOC, in Dataset #2, and a high oleic soybean oil, HOS, in Dataset #5.

The respective rates of thermo-oxidation and the % thermo-oxidation levels show the benefit of an ester composition of the invention with high monounsaturated fatty acid content and low polyunsaturated fatty acid content.

Using the same ester composition, i.e. HOC, datasets #2, #3, #4 ester compositions of FIG. 2 have been processed in three different ways. The ester composition of Dataset #2 has been made as per the chemical route comprising solvent extraction, the RBD classical refining and the chemical process to prepare the 2-EHO. All those steps been performed under usual temperatures and heat exposure.

The preparation of the ester composition of Dataset #3 does not involve this chemical route and heat exposure therewith, but roll-pressing and mechanical refining by filtration, decantation and centrifugation. Dataset #3 ester composition preparation also comprises an enzymatic catalyzed process to prepare the 2-EHO.

Finally the preparation of the ester composition Dataset #4, is the same than the preparation corresponding to Dataset #3 except that the MW-heating & assistance has been used all along the process to further reduce the temperature and exposure time to the minimum required to obtain suitable yields.

Datasets #2, #3, #4 of FIG. 1 clearly show the benefit of the non chemical route, lower temperature, and lower residence time combined with an enzymatic approach of the preparation of the 2-EHO.

Finally Dataset #6 combines all the above outlined benefits, i.e. oil composition and process, yielding the best ester composition in terms of thermo-oxidation rate and percentage. MW assistance has also unexplained benefits in terms of molecular activity given that the preferred oil, UHOC, has good dielectric properties. The enzymes of the invention have selectivity and activity which is improved under the assistance of MW. Comparison between Dataset #5 (chemical process with HOS) and Dataset #6 (process of the invention with UHOC) on FIG. 2 further confirms that the process of the invention produces a better ester composition in terms of thermo-degradation. HOS and UHOC are within the preferred embodiment in terms of composition. Comparison between Dataset #4 and Dataset #6 also proves that using in both cases the cleaner and milder process of the preferred embodiment, the UHOC is to be preferred over the HOC as a starting oil.

Example 15

Measurement of the dielectric properties of the preferred embodiment of the invention as a function of temperature.

The ester composition of example 11, conducted in a way to provide a 25/75 2-EHO/UHOC oil ratio, led to the following dielectric FDD values versus temperature. Those are uniquely low values and low variations with temperature compared to commercially known dielectric oils made from vegetable oil such as FR3© or ester composition therewith.

TABLE 11

| FDD (Tan δ) (ISO 60247 (2004)): | |
|---|---|
| At 35° C.: | 0.00019 |
| At 70° C. | 0.00089 |
| At 90° C. | 0.0018 |
| At 110° C. | 0.0030 |

The examples, values and method steps given above are only for illustrative purposes and should not be construed in a limiting manner.

The invention claimed is:

1. A liquid composition that may be used as a dielectric composition, said composition comprising a mixture of at least one natural triglyceride and at least one fatty acid ester different from triglycerides, said fatty acids of the fatty acid ester being derived from at least one vegetable oil, plant, wood treatment derivate, algae, microalgae, animal fat, or sugar, wherein:
(i) the fatty acids present in the at least one natural triglyceride and in the at least one fatty acid ester different from triglycerides comprise, by weight with respect to the total weight of fatty acids in the esters:
at least 70%, and preferably over 85%, of at least one monounsaturated fatty acid,
0 to less than 10% of at least one polyunsaturated fatty acid,
less than 20% and preferably less than 10% of at least one fatty acid having a hydrocarbon chain containing a number of carbon atoms different from 18, and wherein
(ii) the at least one natural triglyceride present in the mixture corresponds to 10to 90% by weight, preferably to 40and 75% by weight compared to the total weight of the mixture;
wherein the at least one fatty acid ester different from triglycerides is a fatty acid ester of an alcohol selected from ethane 1,2diol; propane 1,2 diol; propane 1,3 diol; methyl-2 propane 1,3 diol; dimethyl 2,2 propane 1,3 diol; ethyl 2 propane 1,3 diol; diethyl 2,2 propane 1,3 diol; 2 butyl 2 ethyl propane 1,3 diol; butane 1,4 diol; pentane 1,5 diol; methyl 4 butane 1,4 diol; pentane 2,3 diol; hexane 1,6 diol; octane 1,8 diol; decane 1,10 diol; dodecane 1,12 diol; octadecane 1,12 diol; phtalyl alcohol; isophtalyl alcohol; terepthalyl alcohol; diglycerol (linear and cyclic); dihydroxyacetone; 1,4 cyclohexane dimethanol; bisphenol-A; isosorbide; 2,5 bis (hydroxymethyl) tetrahydrofurane; 2,5 bis (hydroxymethyl) furane; 1,8 terpine; or 1,8 terpineol.

2. The composition of claim 1, wherein the at least one fatty acid ester different from triglycerides is derived from at least one natural triglyceride by converting the natural triglyceride with an alcohol into the at least one fatty acid ester, wherein said alcohol is different from glycerol.

3. The composition according to claim 1, wherein the at least one fatty acid ester different from triglycerides is essentially a mono-fatty acid ester.

4. The composition according to any one of claims 1 to 3, wherein the fatty acids present in the at least one natural triglyceride and in the at least one fatty acid ester different from triglycerides comprise, by weight with respect to the total weight of fatty acids in the esters, 0.01 to less than 10% of at least one polyunsaturated fatty acid.

5. The composition according to any one of claims 1 to 3 having a pour point lower than −10° C. and a fire point higher than 180° C.

6. The composition of any one of claims 1 to 3, wherein the vegetable oil is a UHO canola oil, or HO sunflower oil, or HO soybean oil or palm oil fraction having a content of mono-unsaturated fatty acids having 12 to 24 carbon atoms in the molecule of greater than or equal to 70%, preferably greater than or equal to 75% by weight.

* * * * *